United States Patent
Aggarwal et al.

(10) Patent No.: US 11,523,101 B2
(45) Date of Patent: Dec. 6, 2022

(54) SYSTEM AND METHOD FOR CAPTURING OMNI-STEREO VIDEOS USING MULTI-SENSORS

(71) Applicant: DreamVu, Inc., Philadelphia, PA (US)

(72) Inventors: Rajat Aggarwal, Punjab (IN); Anoop M. Namboodiri, Kothamangalam-Kerala (IN)

(73) Assignee: DreamVu, Inc., Philadelphia, PA (US)

( * ) Notice: Subject to any disclaimer, the term of this patent is extended or adjusted under 35 U.S.C. 154(b) by 0 days.

(21) Appl. No.: 17/313,253

(22) Filed: May 6, 2021

(65) Prior Publication Data
US 2022/0030212 A1   Jan. 27, 2022

Related U.S. Application Data

(62) Division of application No. 16/277,521, filed on Feb. 15, 2019, now Pat. No. 11,025,888.

(30) Foreign Application Priority Data

Feb. 17, 2018 (IN) .............................. 201841006119

(51) Int. Cl.
*H04N 13/246* (2018.01)
*H04N 13/271* (2018.01)
(Continued)

(52) U.S. Cl.
CPC ......... *H04N 13/246* (2018.05); *H04N 5/2258* (2013.01); *H04N 5/23238* (2013.01);
(Continued)

(58) Field of Classification Search
CPC ............... H04N 13/246; H04N 5/2258; H04N 5/23238; H04N 13/243; H04N 13/271;
(Continued)

(56) References Cited

U.S. PATENT DOCUMENTS 6,795,109 B2   9/2004  Peleg et al.
8,520,138 B1   8/2013  Seale
(Continued)

FOREIGN PATENT DOCUMENTS

CN        104777835 A      7/2015
DE   202017104934 U1     11/2017
(Continued)

OTHER PUBLICATIONS

EP19754401.8 European Search Report dated Oct. 4, 2021.
(Continued)

*Primary Examiner* — Boubacar Abdou Tchoussou
(74) *Attorney, Agent, or Firm* — Wilson Sonsini Goodrich & Rosati

(57) ABSTRACT

A method of calibrating cameras used to collect images to form an omni-stereo image is disclosed. The method may comprise determining intrinsic and extrinsic camera parameters for each of a plurality of left eye cameras and right eye cameras arranged along a viewing circle or ellipse and angled tangentially with respect to the viewing circle or ellipse; categorizing left-right pairs of the plurality of left eye cameras and the plurality of right eye cameras into at least a first category, a second category or a third category; aligning the left-right pairs of cameras that fall into the first category; aligning the left-right pairs of cameras that fall into the second category; and aligning the left-right pairs of cameras that fall into the third category by using extrinsic parameters of the left-right pairs that fall into the first category, and of the left-right pairs that fall into the second category.

16 Claims, 26 Drawing Sheets

(51) Int. Cl.
*H04N 13/243* (2018.01)
*H04N 5/225* (2006.01)
*H04N 5/232* (2006.01)
*H04N 13/00* (2018.01)

(52) U.S. Cl.
CPC ......... *H04N 13/243* (2018.05); *H04N 13/271* (2018.05); *H04N 2013/0081* (2013.01)

(58) Field of Classification Search
CPC ......... H04N 2013/0081; H04N 13/282; G02B 27/646; G02B 13/06; G03B 35/08; G03B 37/04; G03B 37/06; B64C 39/024; B64C 2201/127; B64D 47/08
See application file for complete search history.

(56) References Cited

U.S. PATENT DOCUMENTS

| | | | |
|---|---|---|---|
| 8,548,269 | B2 | 10/2013 | Zargarpour et al. |
| 9,838,668 | B2 | 12/2017 | Prechtl |
| 9,930,225 | B2 | 3/2018 | Villmer et al. |
| 10,154,249 | B2 | 12/2018 | Namboodiri et al. |
| 10,481,482 | B2 | 11/2019 | Mu |
| 10,489,886 | B2 | 11/2019 | Yu et al. |
| 10,499,037 | B1 * | 12/2019 | Wilcox ................ H04N 5/2257 |
| 10,600,253 | B2 | 3/2020 | Rekimoto |
| 10,645,366 | B2 * | 5/2020 | Rowell ................ H04N 9/8227 |
| 11,025,888 | B2 | 6/2021 | Aggarwal et al. |
| 2001/0038413 | A1 | 11/2001 | Peleg et al. |
| 2003/0220971 | A1 | 11/2003 | Kressin et al. |
| 2004/0001138 | A1 | 1/2004 | Weerashinghe et al. |
| 2004/0027451 | A1 | 2/2004 | Baker |
| 2004/0263611 | A1 | 12/2004 | Cutler et al. |
| 2008/0192110 | A1 | 8/2008 | Grover |
| 2008/0298674 | A1 * | 12/2008 | Baker ................ G06V 10/147 382/154 |
| 2012/0105574 | A1 | 5/2012 | Baker et al. |
| 2014/0104378 | A1 | 4/2014 | Kauff et al. |
| 2015/0124060 | A1 | 5/2015 | Hasegawa et al. |
| 2015/0341557 | A1 | 11/2015 | Chapdelaine-Couture et al. |
| 2016/0088280 | A1 | 3/2016 | Sadi et al. |
| 2016/0295108 | A1 | 10/2016 | Cao |
| 2016/0323560 | A1 | 11/2016 | Jin et al. |
| 2016/0352982 | A1 | 12/2016 | Weaver et al. |
| 2016/0353090 | A1 | 12/2016 | Esteban et al. |
| 2017/0142337 | A1 | 5/2017 | Kokaram et al. |
| 2017/0347044 | A1 | 11/2017 | Douady-Pleven et al. |
| 2017/0363949 | A1 | 12/2017 | Valente et al. |
| 2018/0208311 | A1 | 7/2018 | Zhang et al. |
| 2018/0220156 | A1 | 8/2018 | Kim |
| 2018/0247463 | A1 | 8/2018 | Rekimoto |
| 2018/0278916 | A1 | 9/2018 | Kim et al. |
| 2018/0324355 | A1 | 11/2018 | Wang |
| 2019/0011826 | A1 | 1/2019 | Mu |
| 2019/0028693 | A1 | 1/2019 | Yu et al. |
| 2019/0028707 | A1 | 1/2019 | Yu et al. |
| 2019/0035055 | A1 | 1/2019 | Yu et al. |

FOREIGN PATENT DOCUMENTS

| | | |
|---|---|---|
| EP | 2428036 B1 | 9/2015 |
| IN | 201627038877 A | 12/2016 |
| IN | 201847001601 A | 2/2018 |
| KR | 100960781 B1 | 6/2010 |
| KR | 20170109297 A | 9/2017 |
| WO | WO-2019161289 A1 | 8/2019 |

OTHER PUBLICATIONS

Afshari et al. Hardware implementation of an omnidirectional camera with real-time 3D imaging capability. IEEE Xplore. 3DTV Conference: The True Vision—Capture, Transmission and Display of 3D Video (3DTV-CON), Jun. 2011. 4 pages.

Aggarwal et al. Panoramic Stereo Videos Using a Single Camera. IEEE Conference on Computer Vision & Pattern Recognition (CVPR). IEEE Xplore; Dec. 12, 2016.

Anderson et al. JUMP: Virtual reality video. ACM Transactions on Graphics, 35(6):1-13. Nov. 2016.

Co-pending U.S. Appl. No. 29/640,341, inventors Aggarwal; Rajat et al., filed Mar. 14, 2018.

Co-pending U.S. Appl. No. 29/640,347, inventor Aggarwal; Rajat, filed Mar. 14, 2018.

Fingas, Jon. Samsung's 360 Round camera livestreams 3D VR. Engadget.com. Product review published Oct. 18, 2017. 1 page. URL: https://www.engadget.com/2017/10/18/samsung-360-round-vr-camera/.

FLIR. Accurate 360° Spherical Imaging With Multiple Pre-Calibrated Sensors. FLIR White Paper Series. Web Product Brochure. Published on May 4, 2015; FLIR Integrated Imaging Solutions, Inc. 3 pages. URL: https://www.ptgrey.com/Whitepaper/360-spherical-precalibrated-cameras.

Gurrieri et al. Stereoscopic cameras for the real-time acquisition of panoramic 3D images and videos. Proceedings of SPIE—The International Society for Optical Engineering 8648:1-17, Mar. 2013.

Nokia. OZO Technologies. Web product brochure. © 2018 Nokia. Printed Feb. 13, 2019. 7 pages. URL: https://ozo.nokia.com/.

Occam Vision Group. Omni Stereo—Omnidirectional camera, panoramic video and depth. Web product brochure. Occam Vision Group. Accessed Feb. 13, 2019. URL: http://occamvisiongroup.com/product/omni-stereo/.

PCT/US19/18332 International Search Report dated Jun. 18, 2019.

Statt, Nick. Facebook's new Surround 360 video cameras let you move around inside live-action scenes. The Verge.com; Vox Media, Inc.; Published Apr. 19, 2017. 6 pages. URL: https://www.theverge.com/2017/4/19/15345738/facebook-surround-360-video-cameras-f8-conference-2017.

U.S. Appl. No. 16/277,521 Notice of Allowance dated Feb. 24, 2021.

U.S. Appl. No. 16/277,521 Office Action dated Aug. 24, 2020.

U.S. Appl. No. 16/277,521 Office Action dated Jan. 30, 2020.

U.S. Appl. No. 16/277,521 Office Action dated May 12, 2020.

* cited by examiner

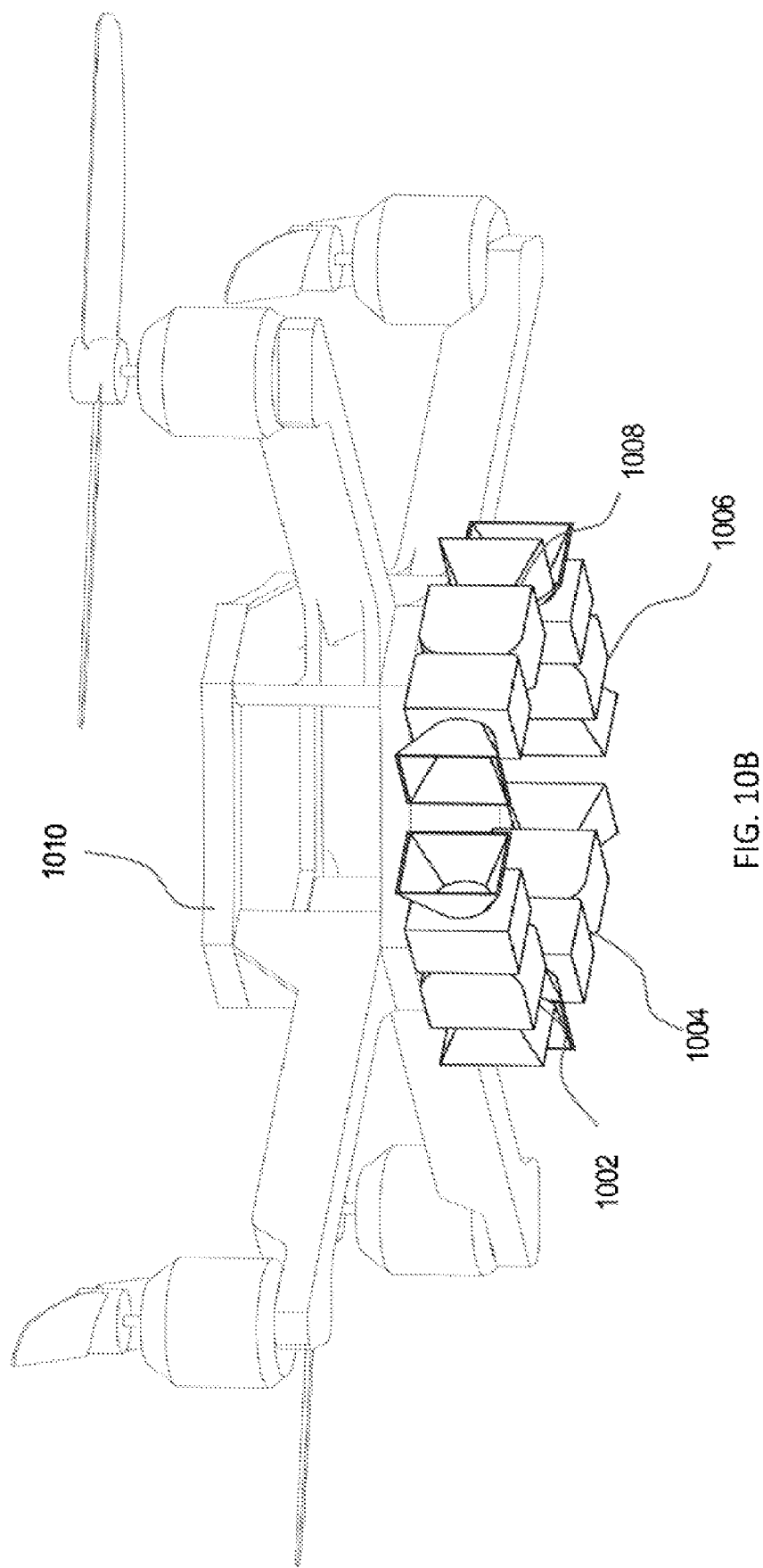

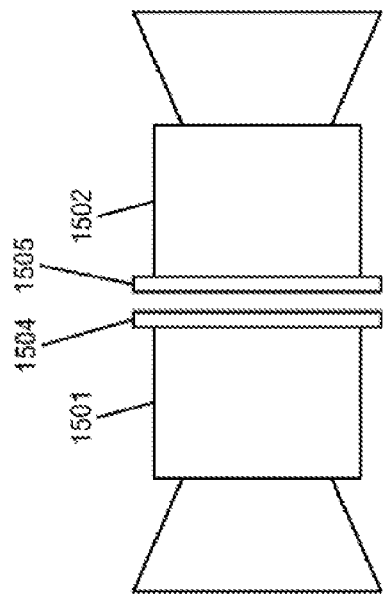
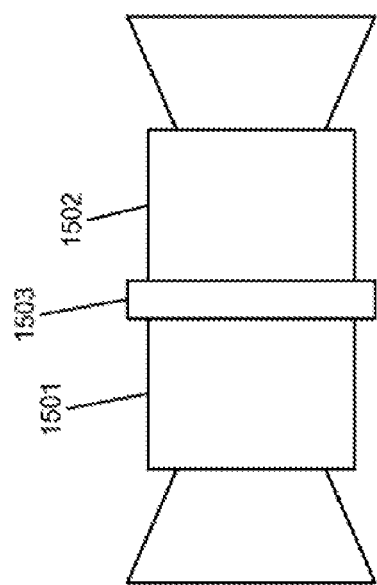
FIG. 15

| Straight Pairs | Perpendicular Pairs | Consecutive Pairs | |
|---|---|---|---|
| 1F – 3B | 1F – 2B | 1F – 2F | 1B – 2B |
| 2F – 4B | 2F – 3B | 2F – 3F | 2B – 3B |
| 3F – 1B | 3F – 4B | 3F – 4F | 3B – 4B |
| 4F – 2B | 4F – 1B | 4F – 1F | 4B – 1B |

SYSTEM AND METHOD FOR CAPTURING OMNI-STEREO VIDEOS USING MULTI-SENSORS

CROSS-REFERENCE

This application is a divisional application of U.S. patent application Ser. No. 16/277,521 filed on Feb. 15, 2019, which application claims the benefit of Indian Provisional Application No. 201841006119, filed on Feb. 17, 2018, which applications are incorporated herein by reference in their entirety for all purposes.

BACKGROUND OF THE INVENTION

Technical Field

The embodiments herein generally relate to capturing omni-stereo videos and, more specially, system and method for capturing omni-stereo videos using multiple sensors.

Description of the Related Art

Existing approaches for capturing omni-stereo videos either involve moving cameras, multi camera rigs or single sensor based optical system. However, in single sensor based optical system cannot produce high resolution omni-stereo videos and have issues in capturing enough light with small aperture. Also it creates issues while capturing high frame rate videos and indoor scenes with less ambient light. Whereas the existing multi camera rigs are heavy and bulky and requires high computation to stitch the views and does not capture omni stereo videos in real time.

SUMMARY OF THE INVENTION

A need exists for improved system and method for capturing omni stereo videos in real time with multi sensors. A further need exists for systems and methods to capture omni-stereo videos with no parallax, no stitching and/or less stereo disparity issues.

Aspects of the invention may be directed to a system for capturing an omni-stereo image, comprising: a multi sensor unit that comprises (a) at least three left eye cameras comprising a first left eye camera; a second left eye camera and a third left eye camera and (b) at least three right eye cameras comprising a first right eye camera; a second right eye camera and a third right eye camera, wherein said at least three left eye cameras and said at least three right eye cameras are arranged along a viewing circle and are angled tangentially with respect to the viewing circle; a memory that stores a set of machine-readable instructions; and a processor that executes the set of machine-readable instructions to: calibrate the at least three left eye cameras and the at least three right eye cameras; compute a left eye panorama based on images captured by the at least three left eye cameras and a right eye panorama based on images captured by the at least three right eye cameras; and combine the left eye panorama and the right eye panorama to obtain the omni-stereo image.

In some embodiments, the left eye panorama may be computed without requiring stitching or compositing of the images captured by the at least three left eye cameras, or wherein the right eye panorama is computed without requiring stitching or compositing of images captured by the at least three right eye cameras. In some embodiments, the at least three left eye cameras are directed clockwise around the viewing circle, and wherein the at least three right eye cameras a directed counter-clockwise around the viewing circle. In some embodiments, the multi sensor unit comprises three left eye cameras and three right eye cameras, wherein each camera includes at least 120 degrees of usable view that is aligned with usable view of other cameras in same direction arranged along the viewing circle. In some embodiments, the multi sensor unit comprises six left eye cameras and six right eye cameras, wherein each camera includes at least 60 degrees of usable view that is aligned with usable view of other cameras in same direction arranged along the viewing circle. In some embodiments, a field of view of the omni-stereo image is at least 360 degrees horizontal (H)×180 degrees vertical (V). In some embodiments, the images captured by the at least left eye cameras and the at least three right eye cameras of a scene are processed by the computation method, wherein the computation method adds each image of the scene and divides the summed images with 2pi/n to obtain an omni-directional image. In some embodiments, the multi-sensor unit is configured to be on a movable vehicle to obtain an omni stereo image or video. The movable vehicle may be a car, a drone, or a robot. In some embodiments, an audio is recorded using microphone along omni stereo image or video. In some embodiments, each of the cameras employs a wide angle lens or a fish eye lens.

Additional aspects of the invention may be directed to a method of forming an omni-stereo image, comprising: obtaining images from at least three left eye cameras and at least three right eye cameras arranged along a viewing circle and angled tangentially with respect to the viewing circle; calibrating the at least three left eye cameras and the at least three right eye cameras; computing, with aid of one or more processors, a left eye panorama based on images captured by the at least three left eye cameras and a right eye panorama based on images captured by the at least three right eye cameras; and combining, with aid of the one or more processors, the left eye panorama and the right eye panorama to obtain the omni-stereo image.

In some embodiments, calibrating the at least three left eye cameras and the at least three right eye cameras comprises categorizing pairs of the left eye cameras and the right eye cameras into one of a plurality of categories, and aligning the pairs of the left eye cameras and the right eye cameras by category. In some embodiments, calibrating the at least three left eye cameras and the at least three right eye cameras comprises converting wide angle images or fisheye images captured by the at least three left eye cameras and the at least three right eye cameras to equirectangular images. In some embodiments, the left eye panorama is computed without requiring stitching or compositing of the images captured by the at least three left eye cameras, or wherein the right eye panorama is computed without requiring stitching or compositing of images captured by the at least three right eye cameras. The method may further comprise calculating a depth image based on the left eye panorama and the right eye panorama.

Further aspects of the invention may be directed to a method of calibrating cameras used to collect images to form an omni-stereo image, comprising: determining intrinsic and extrinsic camera parameters for each of a plurality of left eye cameras and a plurality of right eye cameras arranged along a viewing circle and angled tangentially with respect to the viewing circle; categorizing, with aid of one or more processors left-right pairs of the plurality of left eye cameras and the plurality of right eye cameras into at least a first category, a second category or a third category;

aligning the left-right pairs of cameras that fall into the first category; aligning the left-right pairs of cameras that fall into the second category; and aligning the left-right pairs of cameras that fall into the third category by using extrinsic parameters of the left-right pairs that fall into the first category, and of the left-right pairs that fall into the second category.

In some embodiments, the first category is a straight pair category wherein a left camera and a right camera point in the same direction. In some embodiments, the second category is a perpendicular pair category wherein a left camera and a right camera point in perpendicular directions with respect to one another, and capture overlapping portions of a scene. In some embodiments, the third category is a consecutive pair category wherein a left camera and a right camera point in perpendicular directions with respect to one another, and do not capture overlapping portions of the scene.

Additional aspects and advantages of the present disclosure will become readily apparent to those skilled in this art from the following detailed description, wherein only exemplary embodiments of the present disclosure are shown and described, simply by way of illustration of the best mode contemplated for carrying out the present disclosure. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

FIG. 10A-10B illustrates configuration of plurality of cameras on to a drone according to an embodiment herein;

FIG. 15 shows example schematics of cameras that may be supported.

DETAILED DESCRIPTION OF THE INVENTION

Figure 1:
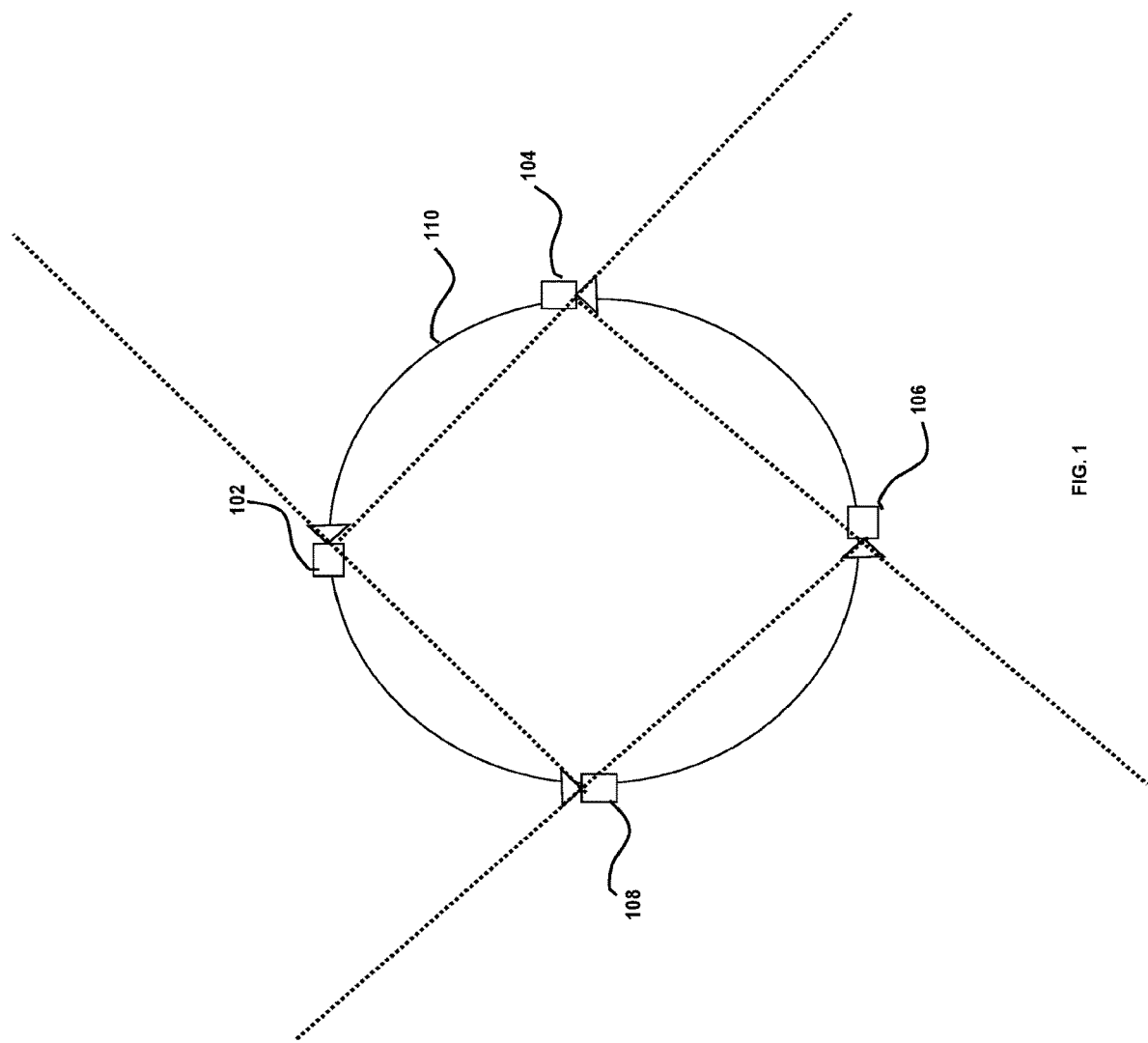
FIG. 1 illustrates a system view of four left cameras forming a viewing circle with diameter equal to baseline according to an embodiment herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein. Referring now to the drawings, and more particularly to FIGS. 1 through 10, where similar reference characters denote corresponding features consistently throughout the figures, there are shown preferred embodiments.

One, two, or more cameras are utilized to capture images. Any description herein of a camera may refer to any type of image capturing device. A camera can be a movie or video camera that captures dynamic image data (e.g., video). A camera can be a still camera that captures static images (e.g., photographs). A camera may capture both dynamic image data and static images. A camera may switch between capturing dynamic image data and static images. Although certain embodiments provided herein are described in the context of cameras, it shall be understood that the present disclosure can be applied to any suitable imaging device, and any description herein relating to cameras can also be applied to any suitable imaging device, and any description herein relating to cameras can also be applied to other types of imaging devices. A camera can be used to generate 2D images of a 3D scene (e.g., an environment, one or more objects, etc.). The images generated by the camera can represent the projection of the 3D scene onto a 2D image plane. Accordingly, each point in the 2D image corresponds to a 3D spatial coordinate in the scene. The camera may comprise optical elements (e.g., lens, mirrors, filters, etc). The camera may capture color images, greyscale image, and the like. The camera may comprise a sensor or an array of sensors to aid in capturing images. In some instances, the camera may utilize charge-coupled device (CCD) or complementary metal-oxide semiconductor (CMOS) image sensors. In some instances, the systems and methods provided herein may use active sensors such as lasers, LiDAR (i.e. solid state LiDAR), or ultrasonic sensors. Any description herein of cameras may also apply to other types of sensors.

The camera may capture an image frame or a sequence of image frames at a specific image resolution. In some embodiments, the image frame resolution may be defined by the number of pixels in a frame. In some embodiments, the image resolution may be greater than or equal to about 352×420 pixels, 480×320 pixels, 720×480 pixels, 1280×720 pixels, 1440×1080 pixels, 1920×1080 pixels, 2048×1080 pixels, 3840×2160 pixels, 4096×2160 pixels, 7680×4320 pixels, or 15360×8640 pixels. In some embodiments, the camera may be a 4K camera or a camera with a higher resolution. Pixels of camera may be square. In other embodiments may take into account non-square pixels or other optical distortions.

A camera may capture a sequence of image frames at a specific capture rate. In some embodiments, the sequence of images may be captured at standard video frame rates such as about 24p, 25p, 30p, 48p, 50p, 60p, 72p, 90p, 100p, 120p, 300p, 50i, or 60i. In some embodiments, the sequence of images may be captured at a rate less than or equal to about one image every 0.0001 seconds, 0.0002 seconds, 0.0005 seconds, 0.001 seconds, 0.002 seconds, 0.005 seconds, 0.01 seconds, 0.02 seconds, 0.05 seconds. 0.1 seconds, 0.2 seconds, 0.5 seconds, 1 second, 2 seconds, 5 seconds, or 10 seconds. In some embodiments, the capture rate may change depending on user input and/or external conditions (e.g. illumination brightness). Cameras may utilize a rolling shutter or a global shutter. The cameras may utilize a fixed-focus lens. Fixed-focus cameras, such as full-focus cameras may be utilized.

The cameras may have any sensitivity. For instance, they may have a sensitive of a greater than, less than, or equal to about 100, 200, 300, 400, 500, 600, 700, 800, 1000 mV/Lux-sec.

In some instances, cameras may employ sensors with low light sensitivity. This may be preferable for operating the cameras in low light settings, such as night time, or indoors. Alternatively, any level of light sensitivity of sensors may be used. The quantum efficiency of the image sensors may exceed 30%, 40%, 50%, 60%, 70%, 80%, 90%, or 95%.

Cameras may be arranged in any matter to capture images of an environment. In some instances, it may be desirable to capture a panoramic image. In some instances, it may be desirable to capture a field of view of at least 180 degrees, 270 degrees, or 360 degrees. It may be desirable to capture such a field of view horizontally and/or vertically. In some instances, a horizontal 360 degree field of view may be captured using a combination of cameras. A vertical 360 degree field of view may or may not be captured using a combination of cameras.

Any number of cameras may be arranged to form a viewing circle. The cameras may be arranged to be directed substantially tangentially relative to the viewing circle. The viewing circle may have a substantially horizontal or lateral orientation. The cameras may be facing tangentially to the viewing circle in a manner so that the central axis of the cameras is coplanar with the viewing circle. Similarly, any number of cameras may be arranged to form a viewing ellipse. The cameras may be similarly arranged tangentially relative to the viewing ellipse. Any description herein of a viewing circle may also be applied to a viewing ellipse. Cameras may be spaced substantially equally around the viewing circle and/or viewing ellipse (e.g., at equal angles). Alternatively, they may be spaced in different manners, but their positioning may be known relative to one another.

The cameras may be left facing and/or right facing. In some instances, both left and right facing cameras may be employed. In some instances, the same number of left and right facing cameras may be used.

In some embodiments, each of the cameras in an arrangement may be the same type of camera. The cameras may employ the same types of sensors. Each sensor may be the same type and/or model. Alternatively, one or more characteristics of the cameras in the arrangement may be different. In some instances, the differences in the characteristics may be known and used to correct any differences the images captured.

Employing cameras with tangential arrangements around a viewing circle and/or viewing ellipse may provide advantages over traditional arrangements where cameras may be facing radially outwards. In radial configurations, both left and right eye views are captured using all the cameras. However, with tangential arrangements, alternative sensors are used for each eye view. For instance, the left cameras that are pointing in the same direction (e.g., clockwise) around the viewing circle may be used to capture views for the left eye, and the right cameras that are pointing in the same direction (e.g., counter-clockwise) may be used to capture views for the right eye, or vice versa. This significantly reduces the amount of computation required to generate omni-stereo images. Reducing computation may advantageously allow simpler processors to be used, or allow images to be processed more quickly and/or use less power. This tangential arrangement may also reduce a disparity jump from one view to another in the omnidirectional image.

FIG. 1 illustrates a system view of four left cameras forming a viewing circle with diameter equal to baseline according to an embodiment herein. The system view includes a first left camera 102, second left camera 104, third left camera 106, fourth left camera 108, and viewing circle 110. 360° information can be extracted from images taken by first left camera 102, second left camera 104, third left camera 106, fourth left camera 108 horizontally displaced by a baseline. The diameter of the viewing circle is equal to the baseline.

For each viewpoint, the set of tangential rays in the clockwise direction account for the left eye views, and the set of tangential rays in the anticlockwise direction account for the right eye views.

To accurately capture stereo information, the camera should be able to capture all the rays tangential to the viewing circle. A usable field of view of each camera is 2pi/n, where n is the number of cameras for left eye. In some instances, a regular camera lens may be used to capture a desired field of view. In other instances, a wide angle lens or fisheye lens may be employed to capture a desired field of view. For example, when n<8, a desired field of view may be greater than 45 degrees. In such instances, wide angle or fisheye lenses may be used.

Figure 2:
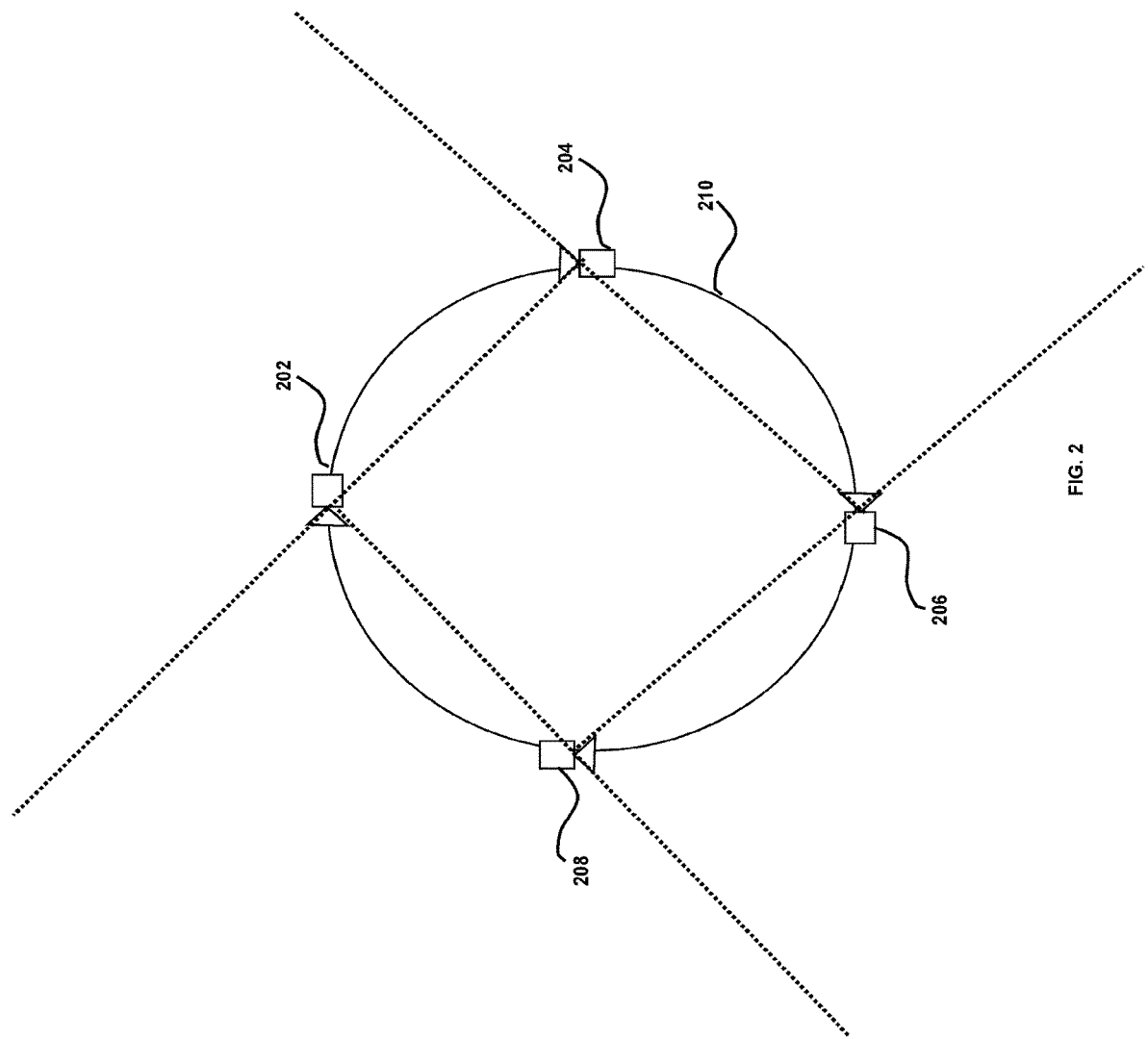
FIG. 2 illustrates a system view of four right cameras forming a viewing circle with diameter equal to baseline according to an embodiment herein.

FIG. 2 illustrates a system view of four right cameras forming a viewing circle with diameter equal to baseline according to an embodiment herein. The system view includes a first right camera 202, second right camera 204, third right camera 206, fourth right camera 208, and viewing circle 210. 360° information can be extracted from images taken by first right camera 202, second right camera 204, third right camera 206, fourth right camera 208 horizontally displaced by a baseline. A usable field of view of each camera is 2pi/n, where n is the number of cameras for right eye/left eye. In an embodiment, the centers of the cameras located at x=r cos θ and y=r sin θ, where r=baseline/2 and central axis of cameras is along the line x cos θ+y sin θ=r, where r is the radius.

In an embodiment, the system comprises three left eyed and three right eyed cameras, where each camera captures a 120 degree field of view. In another embodiment, six left eyed cameras and six right cameras, where each camera captures 60 degree field of view. As previously described, any number (n) of left cameras and/or right cameras may be used. For instance, n may be greater than, less than or equal to about 2, 3, 4, 5, 6, 7, 8, 9, 10, 11, 12, 15, or 20. The number (n) of cameras may within a range between any two of these values. In some instances, the number n may be a multiple of 2, 3, or 4. In some instances, such multiples may be preferred based on available camera lens field of views and/or the desire to cover the whole 360 panorama. The number of cameras may be selected based on the camera type and/or an underlying object that is supporting the cameras. The number of cameras may be selected based on a radius of a viewing circle and/or ellipse.

Figure 3:
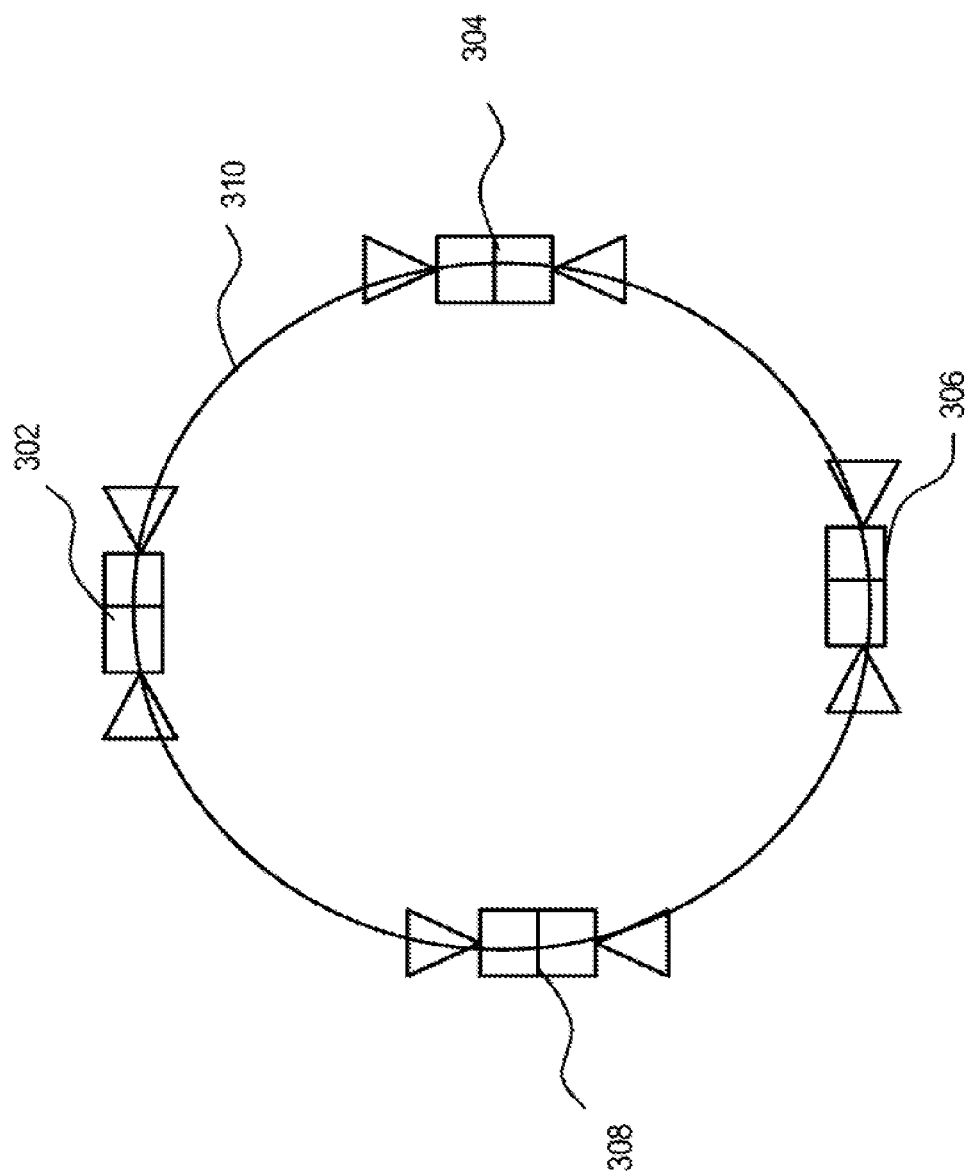
FIG. 3 illustrates a system view of four left and four right cameras arranged along the viewing circle according to an embodiment herein.

The omni stereo videos are captured by the left and right eye views separately. n number of equal cameras are used for both left and right eye which are placed tangentially along the viewing circle as shown in FIGS. 1 & 2. For example n=4 as shown in FIGS. 1 and 2, but n can be any number. A cumulative arrangement of sensors is shown in FIG. 3. Once 2n views are captured (n for left, n for right), the 2n views are processed using computation method to obtain a final omni stereo frame. $x^2+y^2=r^2$, r=b/2 where b is the baseline of the required stereo vision Since the camera can be used for both human and no human viewable stereo panoramas, b can be adapted based on the applications. The computation method includes Lens level calibration and Assembly level calibration.

FIG. 3 illustrates a system view of left and right cameras arranged along the viewing circle (310) according to an embodiment herein. The exploded view includes right cameras (301,303,305,307) and left cameras (302, 304, 306 and 308) placed adjacent each other.

In some instances, the cameras may be arranged in pairs. For example, a left camera and a right camera may be paired together around a viewing circle. For instance, a right camera 301 may be paired with a left camera 302. The pairs of cameras may be arranged so they are facing substantially away from one another (e.g., opposite directions). The viewing axes of the paired cameras may be substantially co-linear. The pairs of cameras may be arrange back to back.

FIG. 15 shows possible supports for the cameras. For instance, pairs of cameras 1501, 1502 may share a common support 1503. The common support may have any shape or arrangement. The common support may or may not be positioned between the two cameras. The common support may be positioned beneath the two cameras, on a side of the two cameras, or above the two cameras. The common support may bear weight of the cameras.

In another embodiment, separate supports 1504, 1505 may be provided for each of the cameras 1501, 1502. The separate supports may bear weight of their respective cameras. The separate supports may be positioned in any manner relative to the cameras, such as between the cameras, underneath the cameras, on a side of the cameras, or above the cameras. Separate supports may optionally allow cameras to move relative to one another. Alternatively, they may maintain the cameras in fixed positions relative to one another.

A support (e.g., common support or separate support) may hold the cameras substantially steady relative to an underlying object. The support may be substantially rigid. The cameras may have a fixed position relative to an underlying object. The cameras may have fixed positions relative to one another. Alternatively, the support may be flexible. The support may allow movement of the cameras relative to an underlying object. Optionally, the support may include one or more dampening mechanism. The support may reduce vibrations from an underlying object, so that the cameras are more steady. The support may or may not include camera stabilizers that reduce vibrations of the cameras. A support may or may not partially or completely enclose a camera or a pair of cameras. A support may optionally form a ring around a camera or a pair of cameras.

In some instances, the cameras may remain substantially stationary relative to one another and/or an underlying object. Alternatively, the cameras may move relative to one another and/or an underlying object. A support may or may not comprise an actuator that may allow a camera to move relative to another camera and/or an underlying object.

A camera may be permanently attached or fixed to a support. Alternatively, a camera may be removable relative to a support. In some instances the camera may be attached or detached in a repeatable manner. A support may be fixed or permanently attached to an underlying object. Alternatively, a support may be removable relative to an underlying object. The support may be attached or detached in a repeatable manner. The position of one or more supports may be adjusted to allow the cameras to be arranged in a desirable manner. For instance, a support may hold cameras relative to an underlying object so that the cameras are positioned around a viewing circle or ellipse. The supports may be adjustable to allow the cameras to be pointed tangentially around a viewing circle or ellipse.

Figure 4:
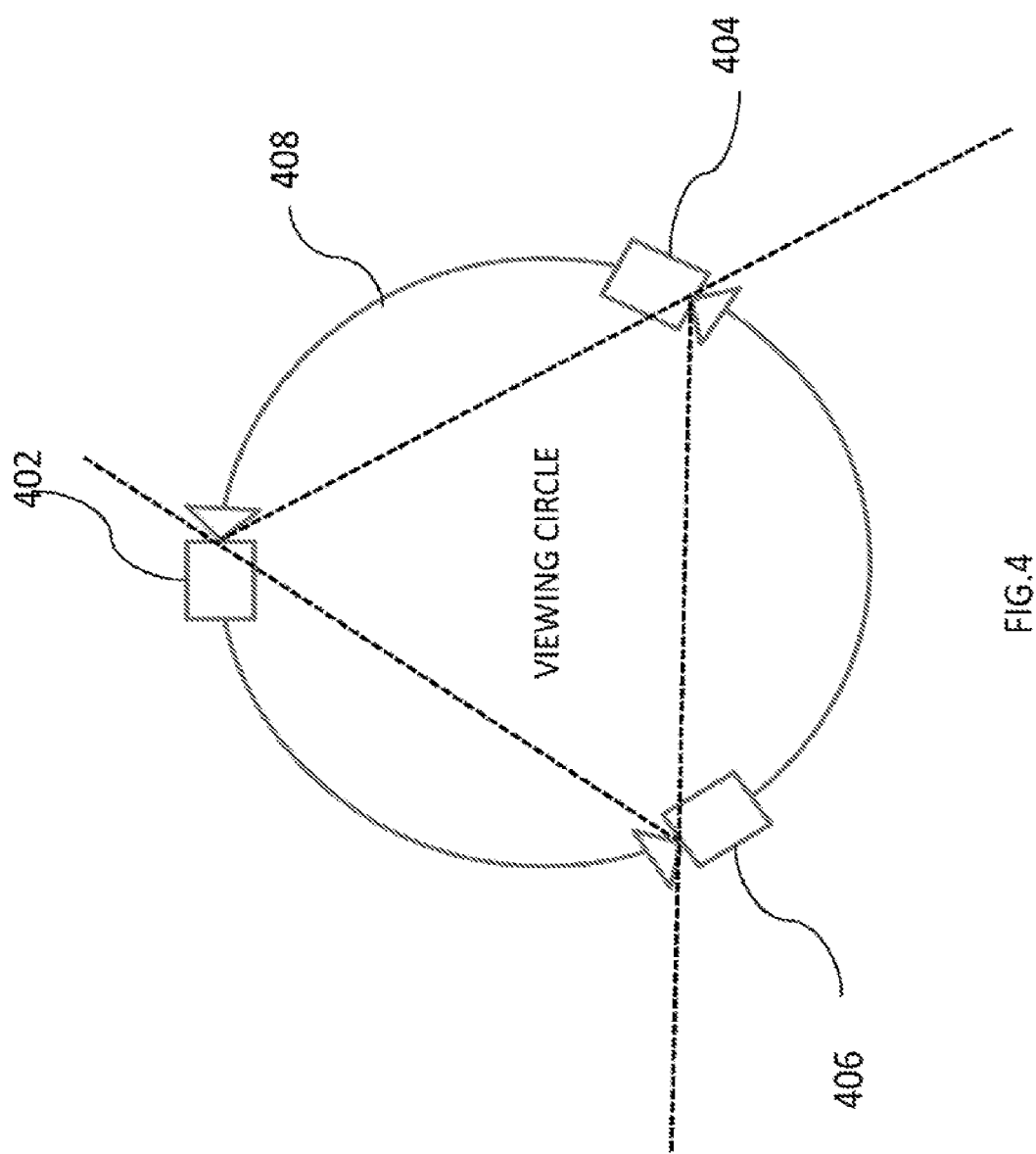
FIG. 4 illustrates an system view of the three left cameras arranges along with the viewing circle according to an embodiment here.

FIG. 4 illustrates a system view of three left cameras forming a viewing circle with diameter equal to baseline according to an embodiment herein. The system view includes a first left camera 402, second left camera 404, third left camera 406 and viewing circle 410.

Figure 5:
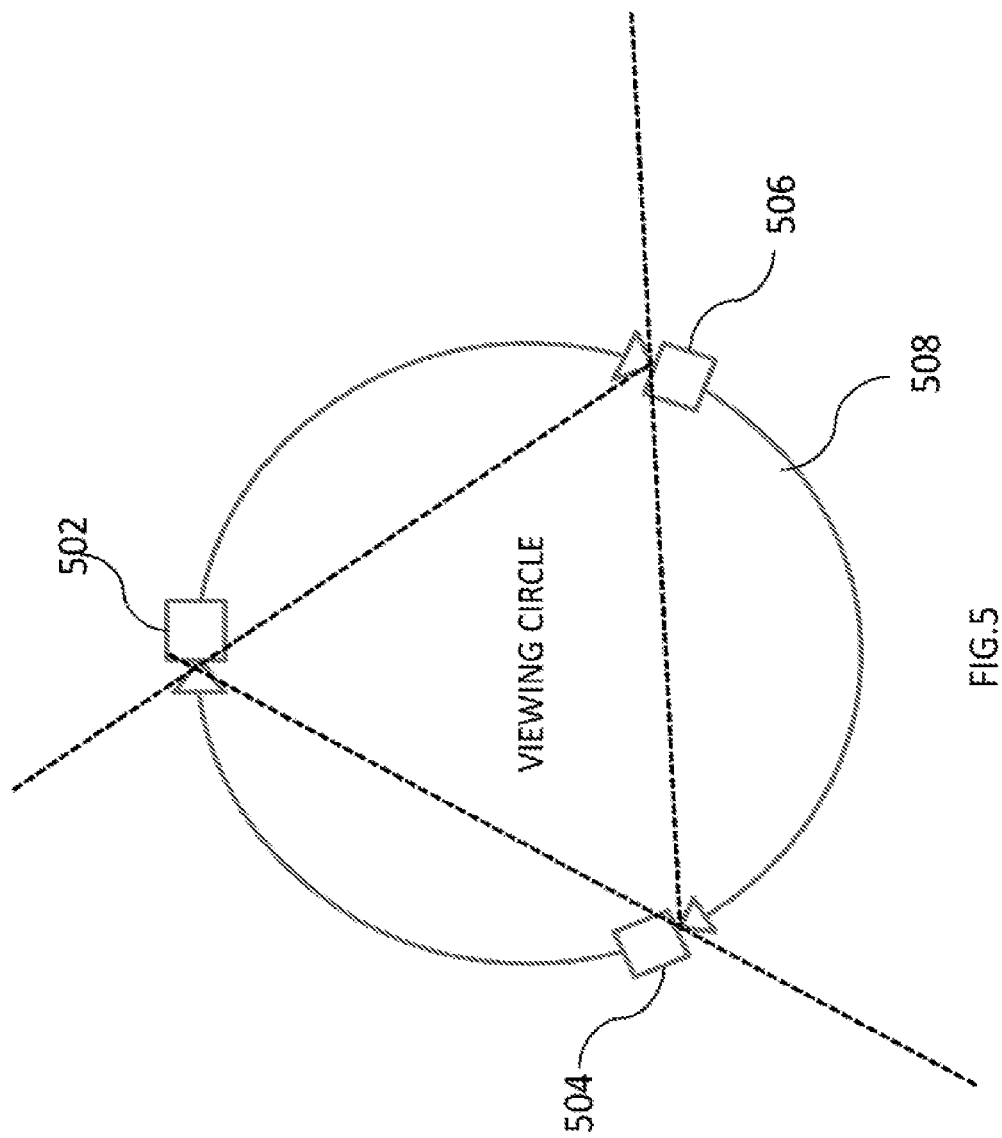
FIG. 5 illustrates an system view of the three Right cameras arranges along with the viewing circle according to an embodiment here.

FIG. 5 illustrates a system view of three right cameras forming a viewing circle with diameter equal to baseline according to an embodiment herein. The system view includes a first right camera 502, second right camera 504, third right camera 506 and viewing circle 510.

Figure 6:
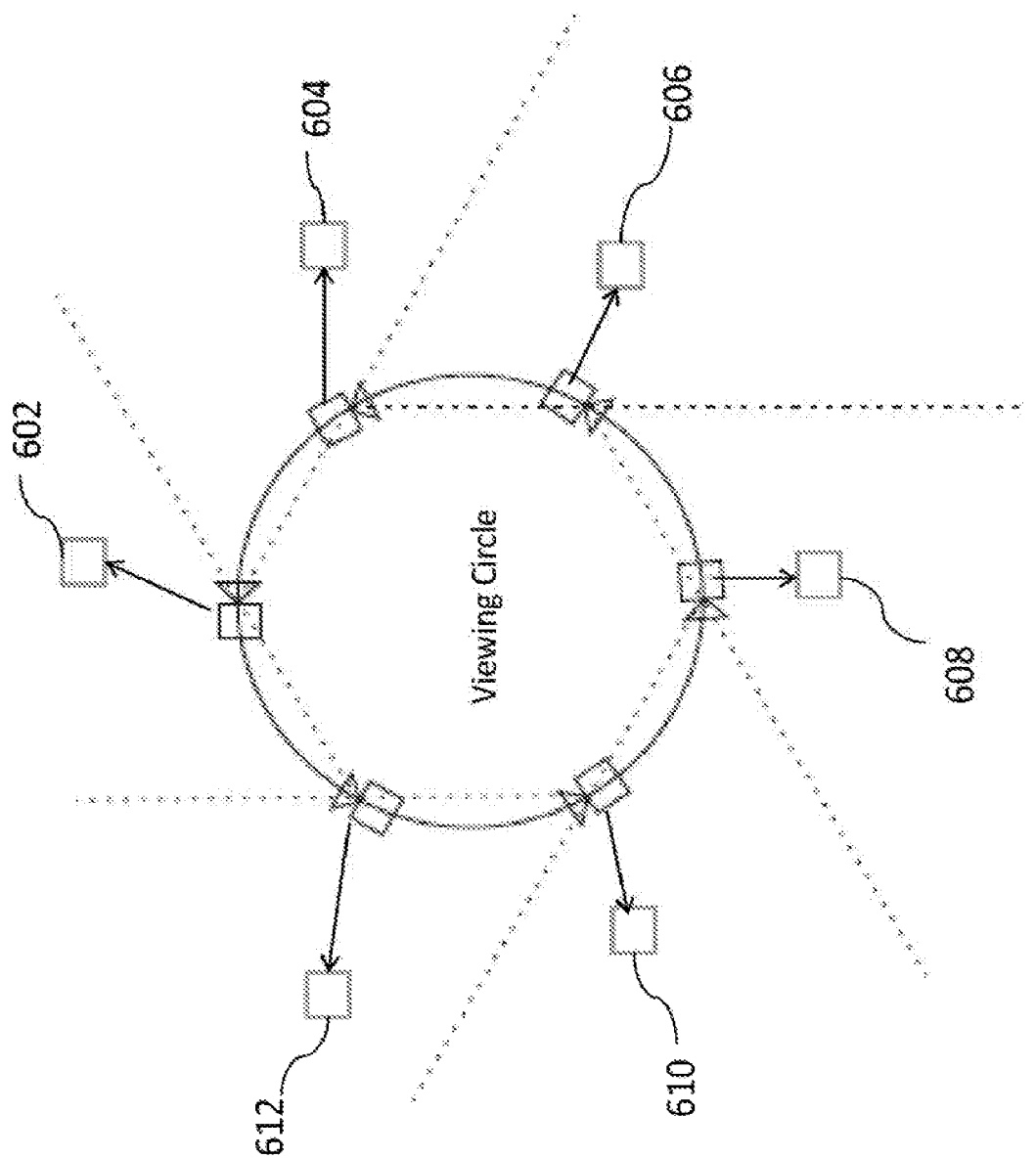
FIG. 6 illustrates an system view of the six left cameras capturing Omni directional images of a scene according to an embodiment here.
Figure 7:
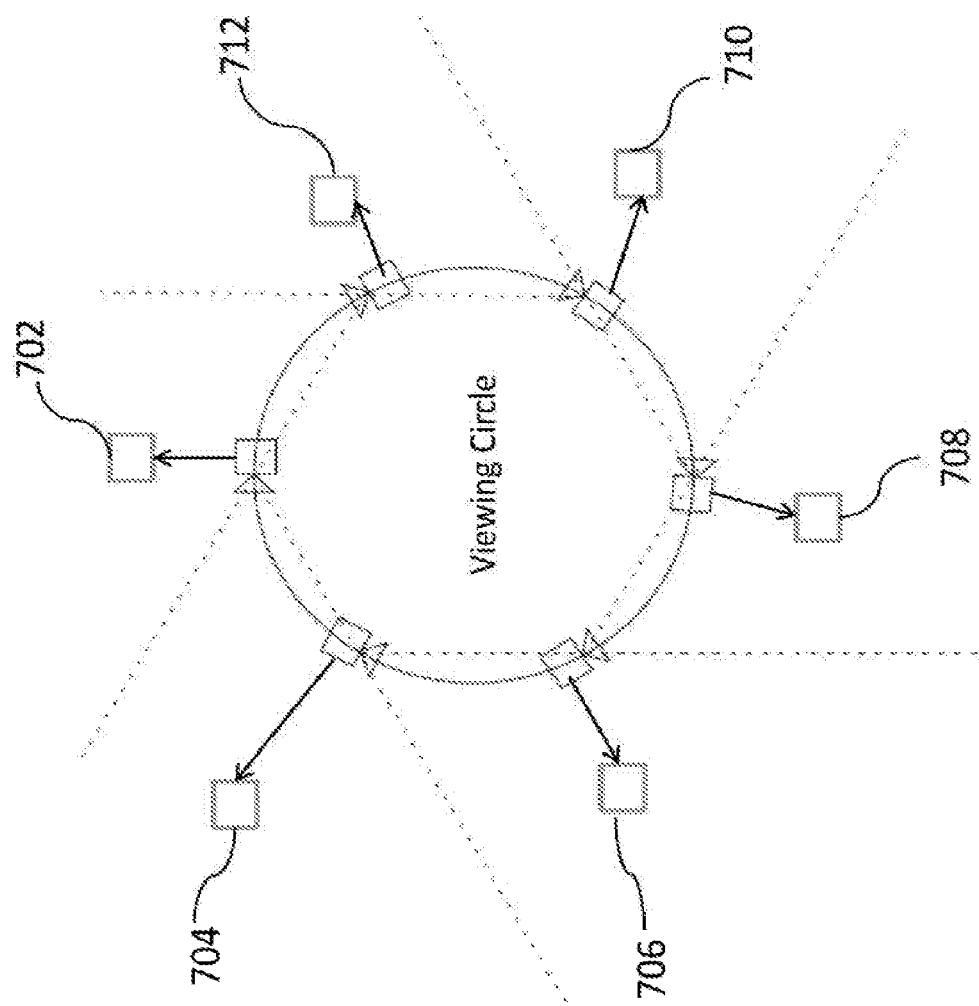
FIG. 7 illustrates an system view of the six Right cameras capturing Omni directional images of a scene according to an embodiment here.

FIG. 6 and FIG. 7 illustrates a system view of the left and right cameras capturing Omni stereo images of a scene according to an embodiment herein. The view includes first left camera 702, second left camera 704, third left camera 706, fourth left camera 708 capturing images of a scene (602, 604 . . . 612). The images include $I_1, I_2 \ldots I_N$, where $I_1$ is a first image, $I_2$ is a second image and $I_N$ is an nth image. In an embodiment the final omni stereo frame is obtained by Computation method. In an embodiment, a maximum field of view of the omni-stereo image which can be captured using the camera design is 360 deg (H)×180 deg (V). H stands for horizontal and V stands for vertical.

Figure 19:
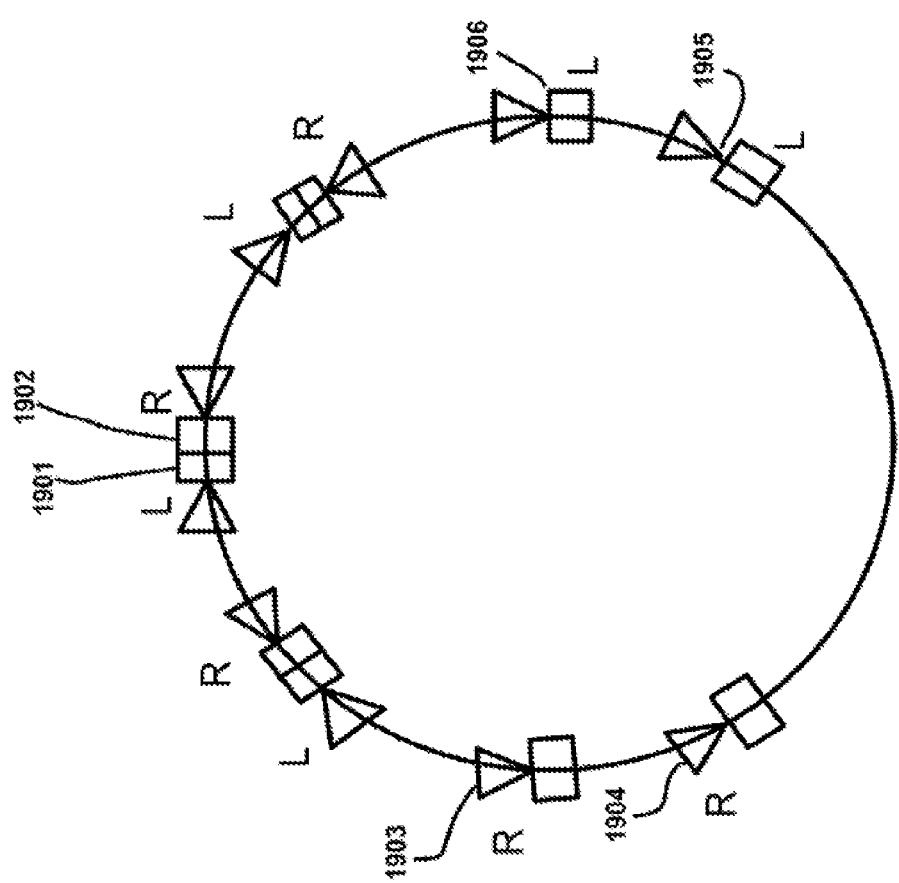
FIG. 19 illustrates a system view with a possible arrangement of cameras.

FIG. 19 shows an exemplary arrangement of cameras. In some embodiments, the cameras may be disposed tangentially around a viewing circle or viewing ellipse. In some embodiments, the same number of left cameras an right cameras may be provided. The left and right cameras may or may not be paired with one another. In some instances, zero, one, two or more left and right cameras may be paired together (e.g., cameras 1901, 1902) and zero, one, two or more right cameras and/or left cameras may be provided separately (e.g., cameras 1903, 1904, 1905, 1906). In some embodiments, it may be desirable to capture images of less than 360 degrees horizontally. Camera arrangements, such as the arrangement illustrated in FIG. 19 may be provided to cover greater than, less than, or equal to about 180 degrees horizontally, or any other value. The unpaired cameras may be directed to cover the desired field of view. The cameras that are provided may or may not be equally spaced around the viewing circle and/or viewing ellipse. In some instances, the cameras may be positioned to capture the desired field of view and one or more gaps in placement may be provided when additional cameras are not needed to capture the desired field of view.

In some embodiments, the viewing circle may be provided horizontally to provide a horizontal panorama. Alternatively, the viewing circle with cameras positioned tangentially around may be positioned vertically to provide a vertical panorama, or at any other angle (e.g., 30 degree angle, 45 degree angle, 60 degree angle, etc.). In some instances, the cameras may be positioned around both horizontal and vertical viewing circles to provide a spherical panorama of the environment. Any additional cameras may be provided. For instance, one, two or more additional cameras may be provided relative to a horizontal viewing circle, vertical viewing circle, or combinations of viewing circles. For instance, one or more upward facing cameras, may be provided in addition to a horizontal viewing circle with arrangements of cameras as described herein. Additionally or alternatively, one or more downward facing cameras may be provided in addition to a horizontal circle with arrangements of cameras as described herein. Similarly, one or more right facing cameras, and/or one or more left facing cameras may be provided in addition to a vertical viewing circle with arrangement of cameras as described herein.

The camera design can also be used on any kind of machines such as cars, vehicles, robots and drones to capture omni stereo videos. Omni stereo content can be used for multiple purposes (i) Virtual Reality and Augmented reality—Omni stereo images/videos can be seen using head mounted displays and (ii) Machine Vision—To do tasks like depth maps, disparity maps which are further used for autonomous navigation of machines.

Figure 8:
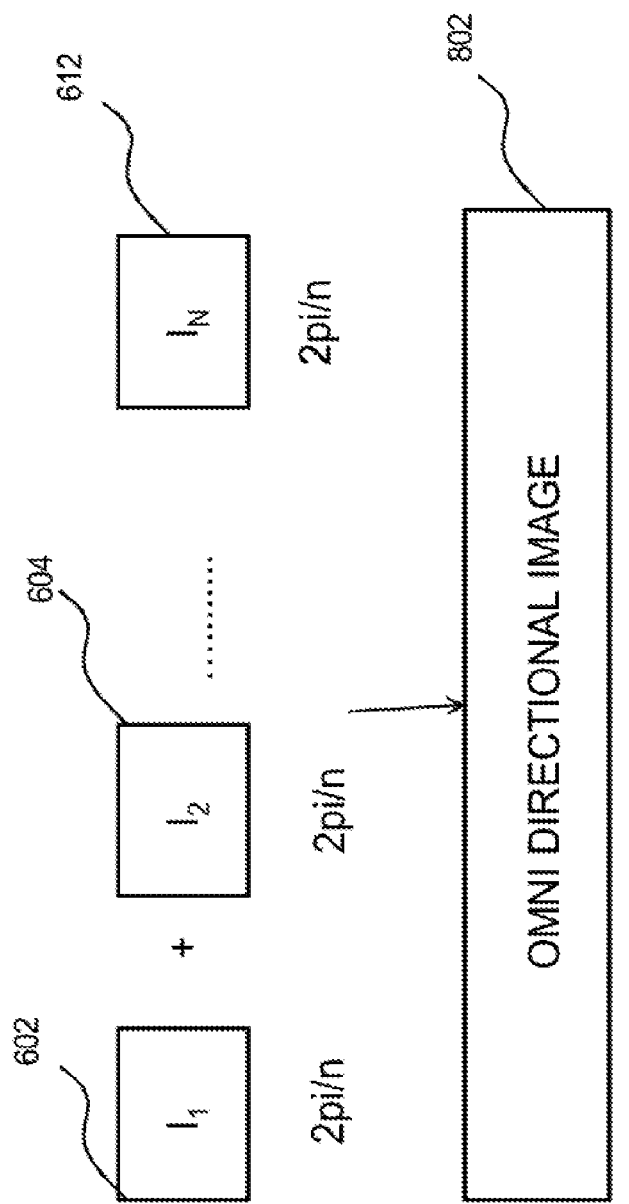
FIG. 8 illustrates a method of processing a plurality of images using a computation method to obtain a omni directional image according to an embodiment here.

FIG. 8 illustrates a method of processing a plurality of images using a computation method to obtain omni directional image according to an embodiment herein. The plurality of images of the scene is processed by the computation method, the computation method adds each image of the scene and then divides the summed images with 2pi/n to obtained the omni directional image. A usable field of view of each camera may be 2pi/n. Even if the field of view of the camera is larger, in some instances, only the 2pi/n portion of the field of view may be utilized.

Such computation may occur for each eye view. For example, the images from all the left cameras may be processed and added as described herein. The summed image may then be divided with 2pi/n to obtain the left eye omnidirectional image. Similarly, the images from all the right cameras may be processed and added as described herein. The summed image may be divided with 2pi/n to obtain the right eye omnidirectional image. The right eye image and left eye image may or may not be slightly different from one another. The right eye image and left eye image may be useful for stereo panoramas. In some instances, the baseline (and/or radius or shape of the viewing circle/ellipse) may be adapted based on the applications. The images captured by the cameras may be used for human and/or non-human applications. Stereo panoramas may be useful for virtual and/or augmented reality applications. For example, omnistereo images or videos can be seen using head mounted displays. Each eye view may correspond to an eye of the viewer (e.g., left eye panorama may be displayed to the left eye of the viewer, right eye panorama may be displayed to right eye of the viewer). The images may be displayed on helmets, goggles, glasses, or any other type of display. The images may optionally be used for machine vision applications. For instance, the images may be utilized in maps that may be useful for autonomous or semi-autonomous navigation. The images may be useful for detecting objects. Detecting objects may be useful when searching for objects, surveying an environment, for collision avoidance, or any other application. The systems and methods provided herein may be employed to computer a depth image. In some instance, a right panorama image and a left panorama image may be used to calculate the depth image. The depth image may be useful in machine vision applications.

In some embodiments, each of the images captured by the various cameras may include images of an environment within a field of view of each respective camera. When multiple cameras are arranged, the cameras may have a field of view that may allow portions of the images of the environment to overlap. Alternatively, the field of view of the cameras may be provided and the cameras may be arranged so that there is no overlap in the field of view. When overlap occurs, the computation may make a determination of how to adjust the image and/or select portions of the image.

As previously discussed, the cameras may be arranged in any manner. In some instances, the cameras may be provided around an underlying object. The cameras may be supported by an underlying object. The underlying object may be a movable object. Alternatively, the underlying object may be a stationary object. The underlying object may or may not be a self-propelled object. For instance, the underlying object may be a vehicle (e.g., land-based vehicle, airborne vehicle (e.g., UAV), water-borne vehicle, spacecraft, etc.). The underlying object may be a wearable device that may be worn by a human or animal (e.g., on the head, around a face, around a torso, on an arm, on a hand, on a leg, or any other portion). The underlying object may be a handheld object, a boom, or any other object.

The cameras may be arranged in a viewing circle. The viewing circle may be around the underlying object or portion of the underlying object. The cameras may be arranged in a substantially coplanar manner. The cameras may be at the same height or may be at varying heights. The cameras may have viewing axes that are substantially horizontal. The cameras may have viewing axes that are on a single plane or on planes that are substantially parallel to one another.

Figure 9A:
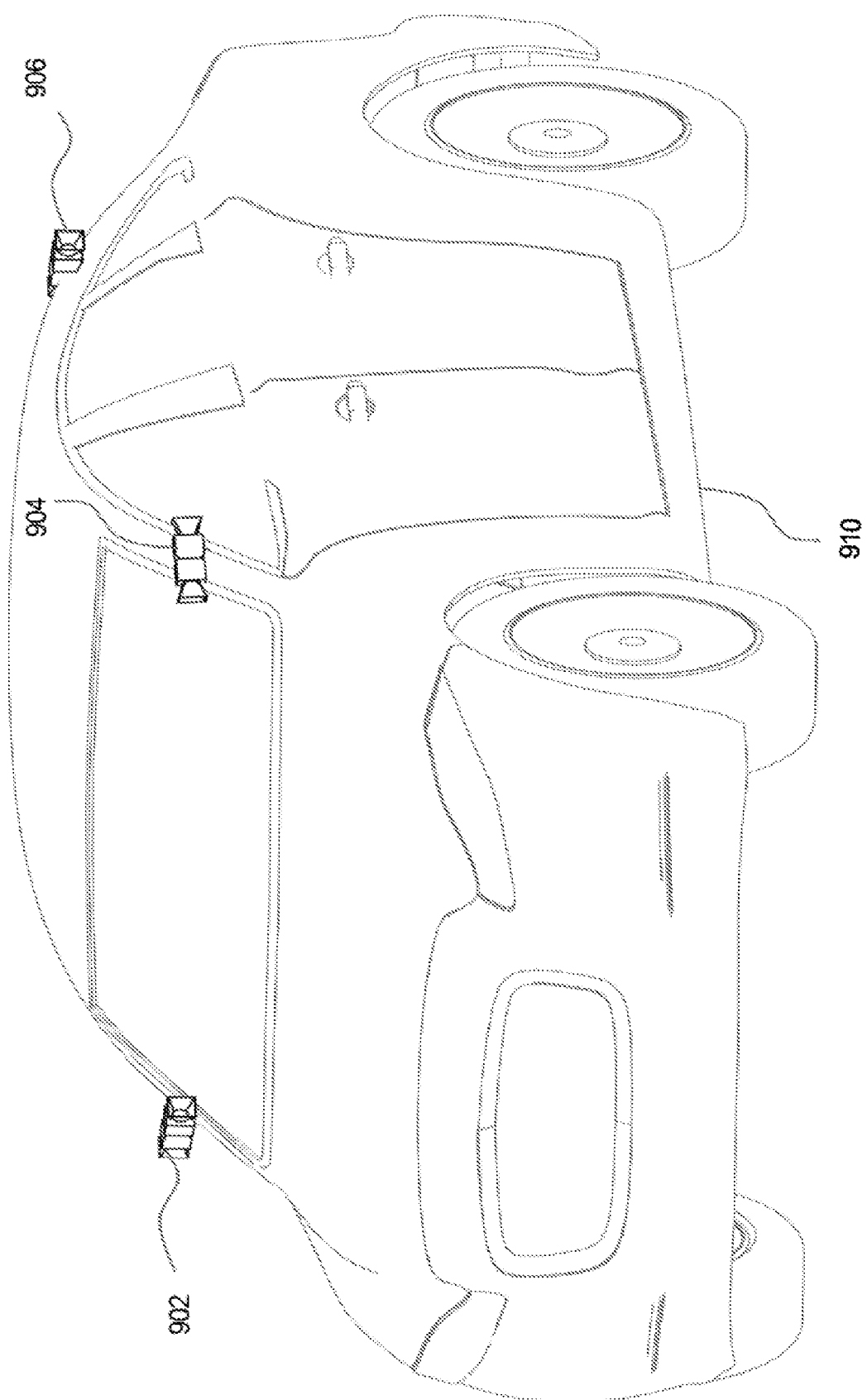
FIG. 9A-9B illustrates an One possible position of cameras configured on top of a car according to an embodiment herein.
Figure 9B:
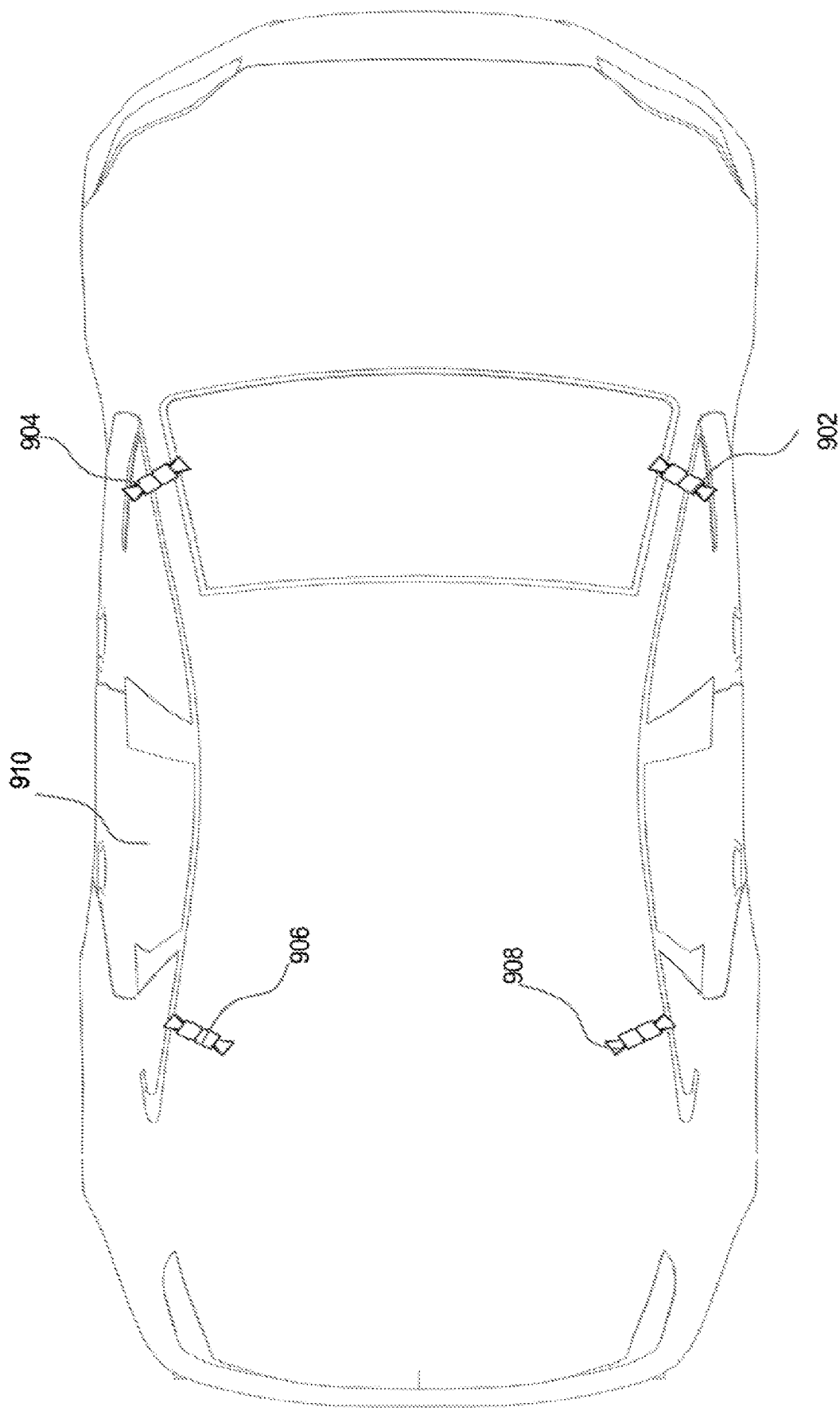
Figure 9C:
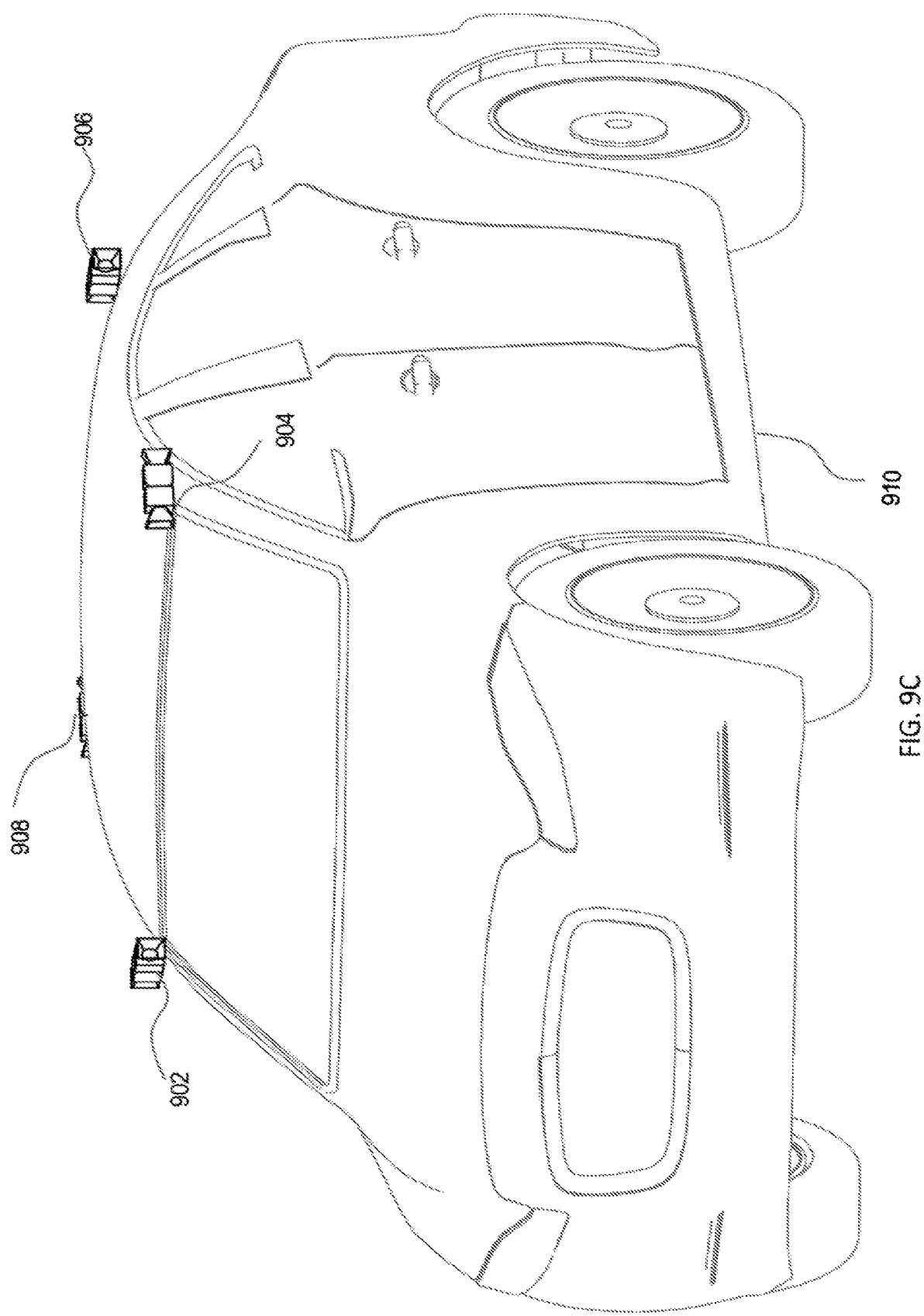
FIG. 9C-9D illustrates another possible position of cameras configured on top of a car according to an embodiment herein.
Figure 9D:
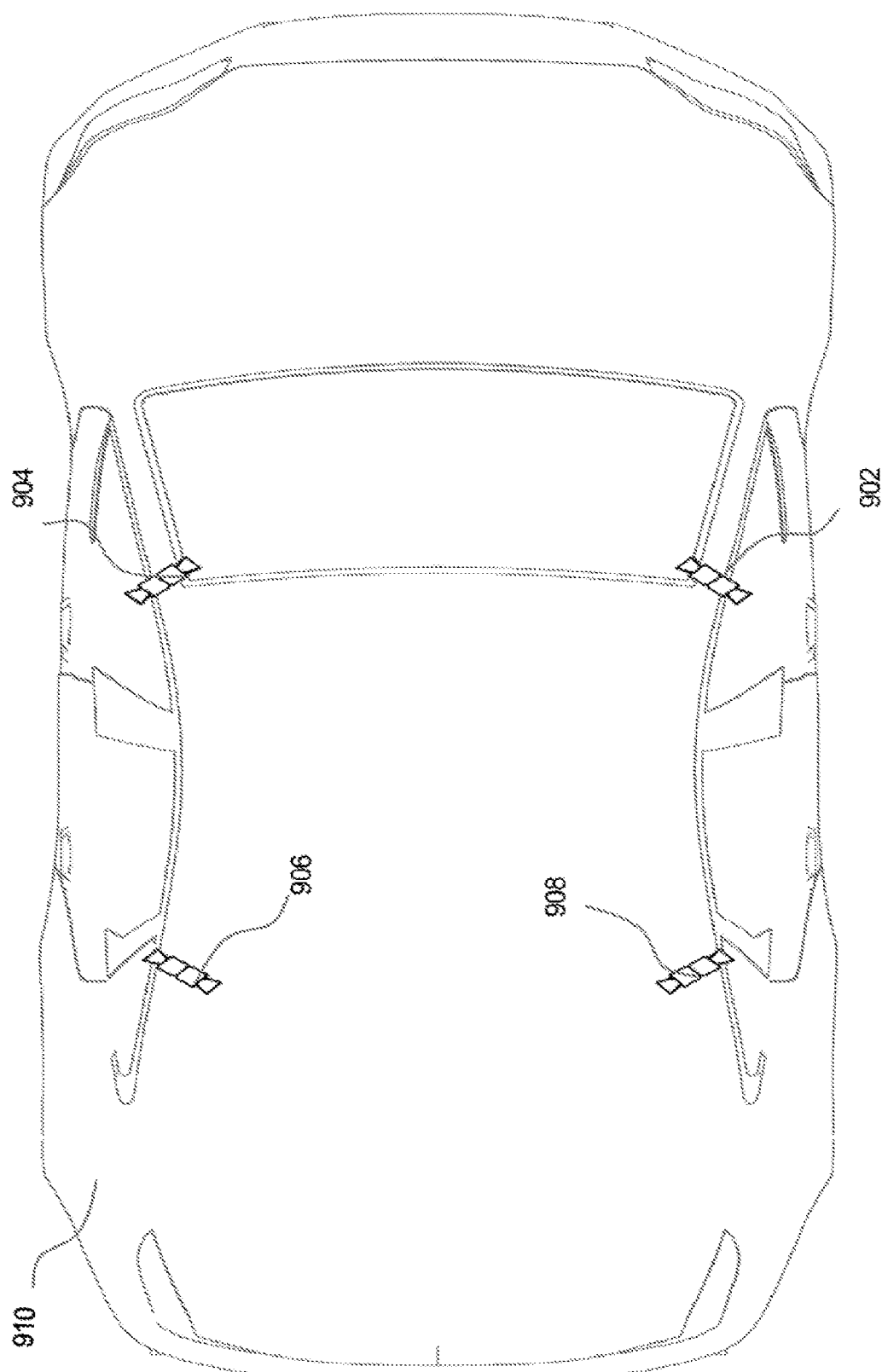

FIG. 9A and FIG. 9B illustrates the side view and isometric view of plurality of cameras configured on top of a car according to an embodiment herein respectively. The plurality of camera includes the first camera 902, the second camera 904, the third camera 906 and the fourth camera 908. The plurality of cameras captures left and right views. After the plurality of cameras captures the left and right views, the left and the right views are processed using the computation method to obtain an Omni stereo video of a scene. Although four sets of cameras are provided by way of example, any other number of cameras may be used as described elsewhere herein.

The cameras may be arranged around a vehicle so that they are substantially on a viewing circle or ellipse. The cameras may be tangential relative to the viewing circle or ellipse. The cameras may be positioned at a front right corner of a vehicle, a front left corner of a vehicle, a rear right corner of a vehicle, and a rear left corner of the vehicle. The cameras may be directed at about 45 degrees (or 135 degrees) relative to an axis extending along the length of the vehicle. The cameras may capture 360 degree view around the vehicle.

The cameras may be placed at any height with respect to the vehicle. The cameras may be at substantially the same height as one another around the vehicle. The cameras may be within 2 feet, 1 foot, 6 inches, 3 inches, or 1 inch of one another with respect to height. The cameras may be positioned at heights such that the fields of view overlap sufficiently to provide a desired panoramic range around the vehicle. The cameras may be placed near a roof of the vehicle, near a bumper of the vehicle, hear a door handle level of the vehicle, or any other height of the vehicle. The cameras may be positioned around the vehicle so that portions of the vehicle do not obstruct images captured by the cameras.

Figure 10A:
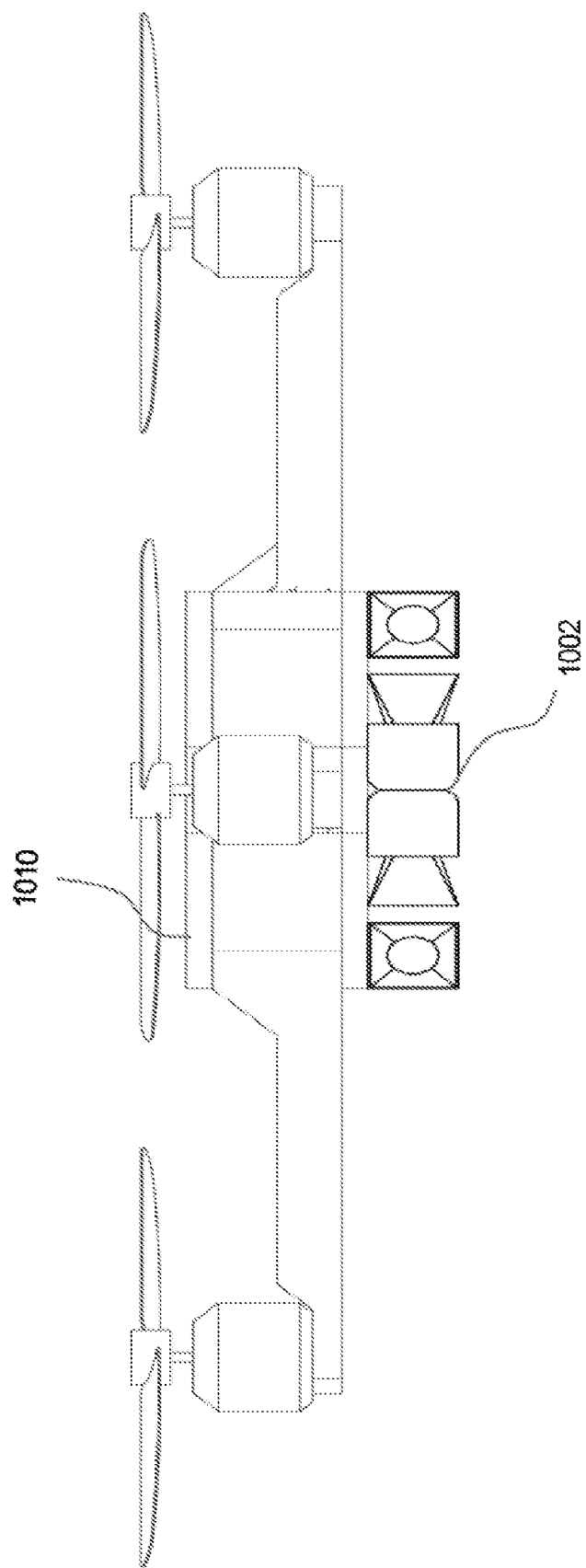

FIG. 10A-10B illustrates configuration of plurality of cameras on to a drone according to an embodiment herein. The drone 1010 is configured with a first camera 1002, a second camera 1004, a third camera 1006, and a fourth camera 1008. The plurality of cameras includes the first camera 1002, the second camera 1004, the third camera 1006 and the fourth camera 1008. The plurality of cameras captures left and right views. After the plurality of cameras captures the left and right views, the left and the right views are processed using the computation method to obtain an omni stereo video of a scene. The camera includes one or more microphones that are adapted to capture audio along with a horizontal disparity stereo panorama. Although four sets of cameras are provided by way of example, any other number of cameras may be used as described elsewhere herein.

Similarly to the vehicle, the cameras may be arranged around a drone so that they are substantially on a viewing circle or ellipse. The cameras may be tangential relative to the viewing circle or ellipse. The cameras may be positioned at 90 degrees relative to one another around the drone. For instance, left cameras may be positioned at 90 degree intervals around the viewing circle, and right cameras may be positioned at 90 degree intervals around the viewing circle. The viewing circle may encompass a central body of a drone, or an entirety of the drone. The cameras may capture 360 degree view around the drone.

The cameras may be placed at any vertical placement with respect to the drone. The cameras may be at substantially the same vertical placement as one another around the drone. The cameras may be within 1 foot, 6 inches, 5 inches, 4 inches, 3 inches, 2 inches, 1 inch, one half inch, one quarter inch, or one eighth inch of one another with respect to height. The cameras may be positioned at heights such that the fields of view overlap sufficiently to provide a desired panoramic range around the drone. The cameras may be placed underneath one or more rotors/propellers of a drone, underneath one or more arms of a drone, or alone or above one or more arms or rotors/propellers of a drone, or any other height of the drone. The cameras may be positioned around the drone so that portions of the drone do not obstruct images captured by the cameras.

Figure 11B:
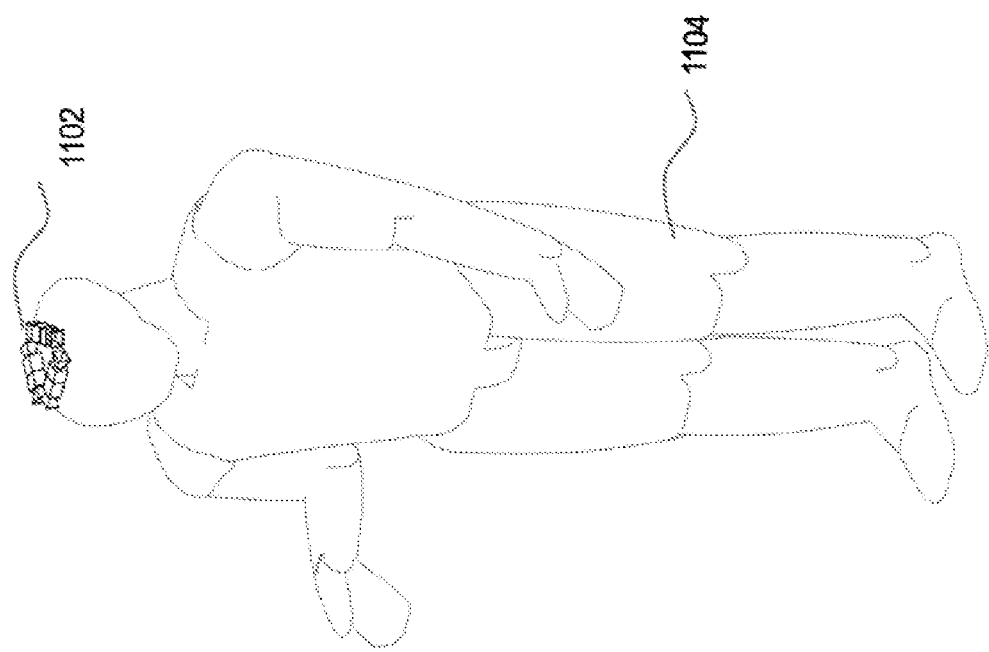
FIG. 11A-11B illustrates configuration of plurality of cameras on to a robot according to an embodiment herein.
Figure 11A:
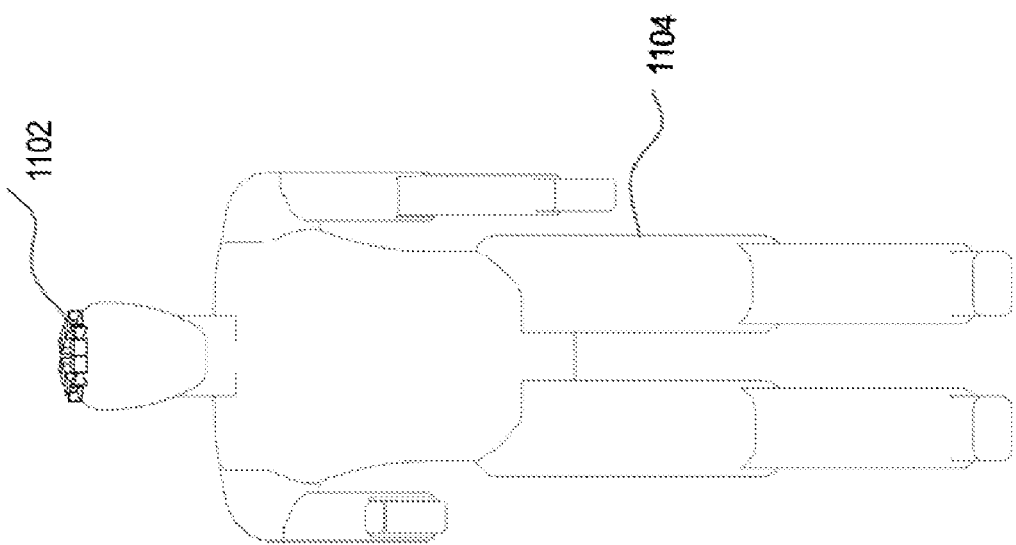

FIG. 11A-11B illustrates configuration of plurality of cameras on to a robot according to an embodiment herein. The robot 1104 is configured the plurality of camera 1102. The plurality of cameras captures left and right views. After the plurality of cameras captures the left and right views, the left and the right views are processed using the computation method to obtain an omni stereo video of a scene. Although three sets of cameras are provided by way of example, any other number of cameras may be used as described elsewhere herein.

Similarly, the cameras may be arranged around a robot so that they are substantially on a viewing circle or ellipse. The cameras may be tangential relative to the viewing circle or ellipse. The cameras may be positioned at 120 degrees relative to one another around the robot. For instance, left cameras may be positioned at 120 degree intervals around the viewing circle, and right cameras may be positioned at 120 degree intervals around the viewing circle. The viewing circle may encompass an entirety of the robot or just a portion of the robot. For instance, the viewing circle may be smaller than a head of a robot, or may encompass a body of the robot. The cameras may capture 360 degree view around the drone.

The cameras may be placed at any vertical placement with respect to the robot. The cameras may be at substantially the same vertical placement as one another around the robot. The cameras may be within 1 foot, 6 inches, 5 inches, 4 inches, 3 inches, 2 inches, 1 inch, one half inch, one quarter inch, or one eighth inch of one another with respect to height. The cameras may be positioned at heights such that the fields of view overlap sufficiently to provide a desired panoramic range around the robot. The cameras may be placed on top of a head of a robot, around a head of a robot, around a torso of a robot, around an arm of a robot, around a waist of a robot, around a leg of a robot, or any other height of the robot. The robot may or may not be a humanoid robot. The robot may be propelled with aid of one or more wheels, legs, rotors, propellers, treads, paddles, or any other propulsion mechanism. The cameras may be positioned around the robot so that portions of the robot do not obstruct images captured by the cameras.

The cameras may similarly be positioned on a living being, such as a human or animal. The cameras may be supported by a wearable device that is worn by the human or animal. Any description herein of the camera placement around a robot may also be applied to a human or animal.

Figure 12:
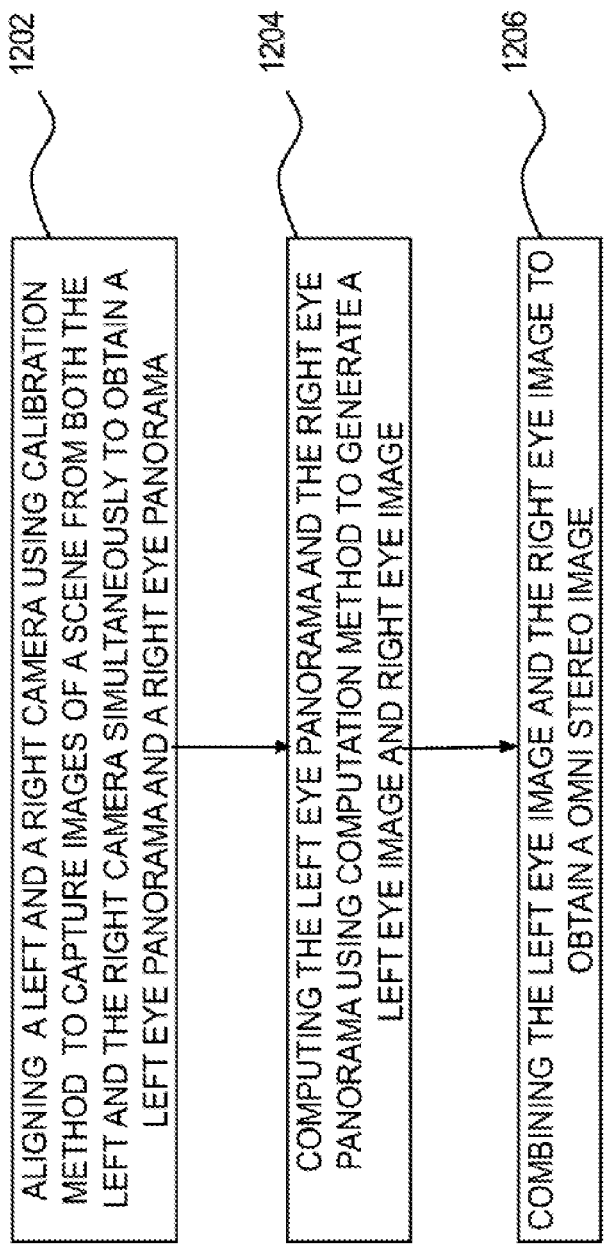
FIG. 12 illustrates a method of capturing omni stereo videos using multi-sensors approach according to an embodiment herein.

FIG. 12 illustrates a method of capturing omni stereo videos using multi-sensor approach according to an embodiment herein. At step 1202, aligning a left and a right camera using calibration method to capture images of a scene from both the left and the right camera simultaneously to obtain a left eye panorama and a right eye panorama. At step 1204, computing the left eye panorama and the right eye panorama using computation method to generate a left eye image and right eye image. At step 1206, combining the left eye image and the right eye image to obtain an Omni stereo image.

Left cameras may be aligned using a calibration method. Examples of calibration methods are described in greater detail elsewhere herein. Other calibration methods known or later developed may be utilized. The left cameras may be aligned based on the calibration method.

Right cameras may be aligned using a calibration method. Examples of calibration methods are described in greater detail elsewhere herein. Other calibration methods known or later developed may be utilized. The right cameras may be aligned based on the calibration method. The same calibration methods may be used for right and left cameras. Alternatively, different calibration methods may be employed. In some instances, a calibration method may be selected based on one or more sets of instructions, or sensed conditions of the environment, underlying object, or cameras.

The calibration techniques utilized may minimize or reduce differences between an ideal lens models and the camera-lens combination that was used, optical defects such as distortions, exposure differences between images, vignetting, camera response and chromatic aberrations.

In aligning the cameras, the positioning of the cameras may or may not be altered. In some instances, the positioning of the cameras may be manually altered. Alternatively, the positioning of the cameras may be altered with aid of one or more actuators. One or more supports for a camera or pair of cameras may comprise an actuator that may allow the camera to be aligned. A camera be physically displaced, or one or more axis of rotation of a camera (e.g., pitch, roll, yaw) may be altered. One or more control signals may be generated by a processor and sent to an actuator to alter or maintain a position of a camera.

In some instances, aligning a camera need not result in movement of a camera. In some instances, aligning a camera may include gathering data about a disposition of a camera (e.g., location, angle, etc.) and using the information about the disposition of the camera when processing images captured by the camera. The disposition of the cameras relative to one another, an underlying object, and/or the environment may be considered when processing the images captured by the cameras. A usable portion of a field of view may be adjusted based on the information. In some instances, the calculations when combining the images together may be adjusted based on the information.

In some instances, alignment may be used to transform an image to match a view point of the image it is being composited with. The alignment may employ changes in coordinate systems so that the image can adopt a new coordinate system which may output an image matching the desired viewpoint. This may include translation of an image, rotation of an image, a similarity transform that utilizes translation, rotation and scaling of an image, projective transform, or any other type of transformation.

In some instances, one or more camera settings may be adjusted based on the calibration steps. For instance, factors such as shutter speed, focal depth, aperture, ISO, or any other factors may be adjusted.

After calibration of the cameras, images may be captured by the various cameras. The cameras around the viewing circle may capture images simultaneously. Both the right and left eye cameras may capture images. In some instances, all cameras may be live-capturing video images or a series of still images simultaneously.

A left eye panorama may be computed using one or more computation method. Similarly the right eye panorama may be computed using one or more computation method. The left and right eye panoramas may be calculated independently of one another. The same computation may be used for each side. Alternatively, different computations may be used. In some instances, a computation method may be selected from a plurality of available computation methods based on instructions provided, or sensed information about the environment, underlying object, and/or cameras. The computation methods may or may not incorporate information gathered at the calibration stage.

Any computation method known or later developed in the art may be used. In preferable embodiments, stitching techniques may not be required to construct the resulting panoramic image. In alternative instances, image stitching techniques may be employed to combine images from multiple cameras. In some instances, computation methods may employ feature detection, such as keypoint detection. Corners, blobs, Harris corners, and difference of gaussian of Harris corners (DoG) may be utilized features since they are repeatable and distinct. In some instances, the computation methods may employ image registration. One or more features may be matched together. Optionally, this may be conducted in a manner to minimize differences between overlapping pixels. A RANSAC iterative method may optionally be employed.

Obtained images may be composited. The images may be blended together. This may include color adjustments, motion compensation, deghosting, or any other type of technique to form a seamless combination of the images. The resulting images may be arranged using a map projection. For example, a rectilinear projection, cylindrical projection, spherical projection, or a stenographic or fisheye projection may be employed.

Optionally, images captured from the cameras may be concatenated linearly side by side to form the panorama. In some instances, no additional processing may be required. By having the cameras face tangentially, the calculations may therefore be simplified. This may require less processing with the images. The arrangement of cameras may advantageously allow for simpler processing, which can reduce cost, size, and/or power consumption. In some embodiments, depth computations may be used to align the cameras. After the alignment is done, the individual images may be placed side by side to create a panorama, such as a 360 degree panorama.

The left and right eye images may be combined to provide an omni-stereo image. The resulting omnistereo image may advantageously provide a realistic view as an individual with two eyes viewing the environment may see. The omni stereo image may have any field of view. In some instances, the field of view may encompass at least 90 degrees, 180 degrees, 270 degrees, or 360 degrees horizontally. The field of view may encompass at least 90 degrees 180 degrees, 270 degrees, or 360 degrees vertically. The field of view may be less than or equal to any of the values provided herein. For instance, the maximum field of view may be 360 degrees horizontal by 180 degrees vertical. The field of view may be any combination of dimensions.

Figures 16A, 16B:
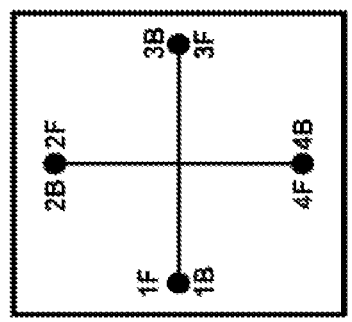
FIG. 16A-16B provide examples of arrangements for camera calibration.

FIGS. 16A-16B show an example of arrangements for camera calibration. FIG. 16A shows a possible camera arrangement with four left cameras and four right cameras. Any number and placement of cameras may be employed, as described elsewhere herein. The cameras may optionally be positioned equally around a viewing circle or ellipse.

The camera pair configurations may be classified into one or more categories. For example, the camera pairs may be classified as straight pairs, perpendicular pairs, and consecutive pairs, as illustrated in FIG. 16B.

The straight pairs of back and front lenses which may be standard stereo pairs where rotation between the lenses is close to zero. For example, camera 1F and camera 3B, which face substantially the same direction (e.g., their viewing axes may be substantially parallel) may be considered straight pairs. Perpendicular pairs may include pairs of back and front lenses which may be stereo pairs where rotation between the lenses is around 90 degrees in one axis and close to zero in a remaining axis. For instance, camera 1F and camera 2B may be considered stereo pairs. The cameras may face directions that are substantially perpendicular to one another (e.g., their viewing axes may be perpendicular). Their fields of view may compass the same or similar areas. The consecutive pairs may include pairs of front or back lenses respectively, which are adjacent in nature. For example, camera 1F and camera 2F may be considered consecutive pairs. These cameras may face directions that are substantially perpendicular to one another (e.g., their viewing axes may be perpendicular) but may not be pointing to the same field of view or area.

Although four cameras are provided as an example, this calibration technique may apply to any number of cameras. The same categories may be employed with different arrangements of cameras. For examples, if six right cameras and six left cameras were employed, there may still be straight pairs, perpendicular pairs, and consecutive pairs. Alternatively, different categories may be provided based on the number of cameras.

Figure 17:
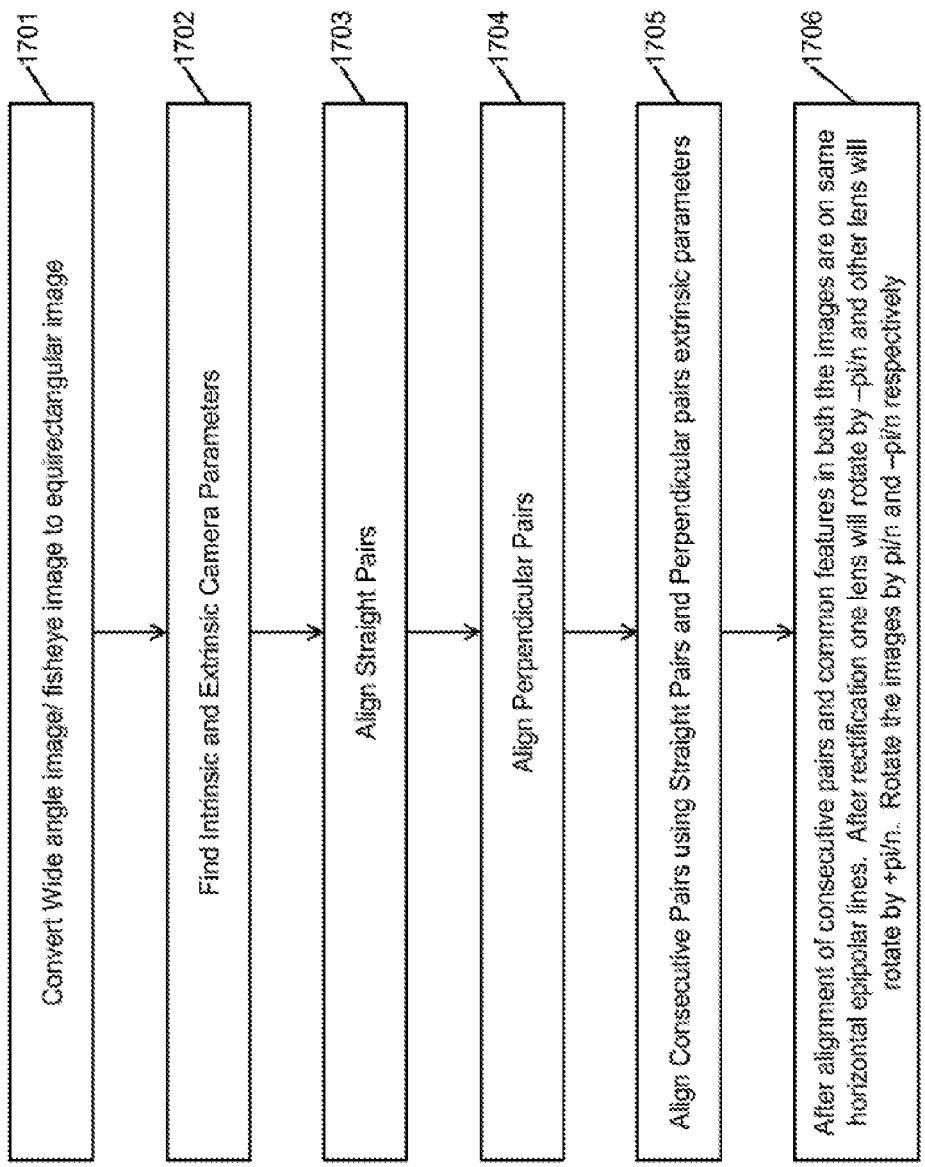
FIG. 17 provides an example of a method for camera calibration.

FIG. 17 shows an example of a method for calibration. In some embodiments, the cameras may utilize wide angle lenses or fisheye lenses. If such lenses are employed, a wide angle or fish eye image may be converted to an equirectangular image 1701. If regular lenses that capture rectangular images are employed, then this step may not be necessary.

Then, intrinsic and extrinsic camera parameters cameras may be found 1702. In some instances, intrinsic parameters may incorporate focal length, image sensor format, principal point. In some instances, lens distortion may be another example of an intrinsic parameter. Intrinsic parameters may allow a mapping between camera and pixel coordinates within an image frame. Optionally, extrinsic parameters may incorporate positioning information for the camera, such as the camera's viewing center and/or camera's heading within the environment (e.g., within world coordinates). The camera's location and angle within a world frame may be determined.

The straight pairs of cameras may be aligned 1703. Alignment may incorporate any of the steps or characteristics as described elsewhere herein.

The perpendicular pairs of cameras may be aligned 1704. Such alignment may take place in sequence or in parallel with aligning the straight pairs of cameras. Such alignment may take place in any order.

The consecutive pairs of cameras may be aligned using extrinsic parameters of the straight pairs and perpendicular pairs 1705.

After alignment of the consecutive pairs, common features in both the images may be on the same horizontal epipolar lines. After rectification one lens may rotate by −pi/n and the other lens may rotate by +pi/n. The images may be rotated by pi/n and =pi/n respectively.

Figure 18:
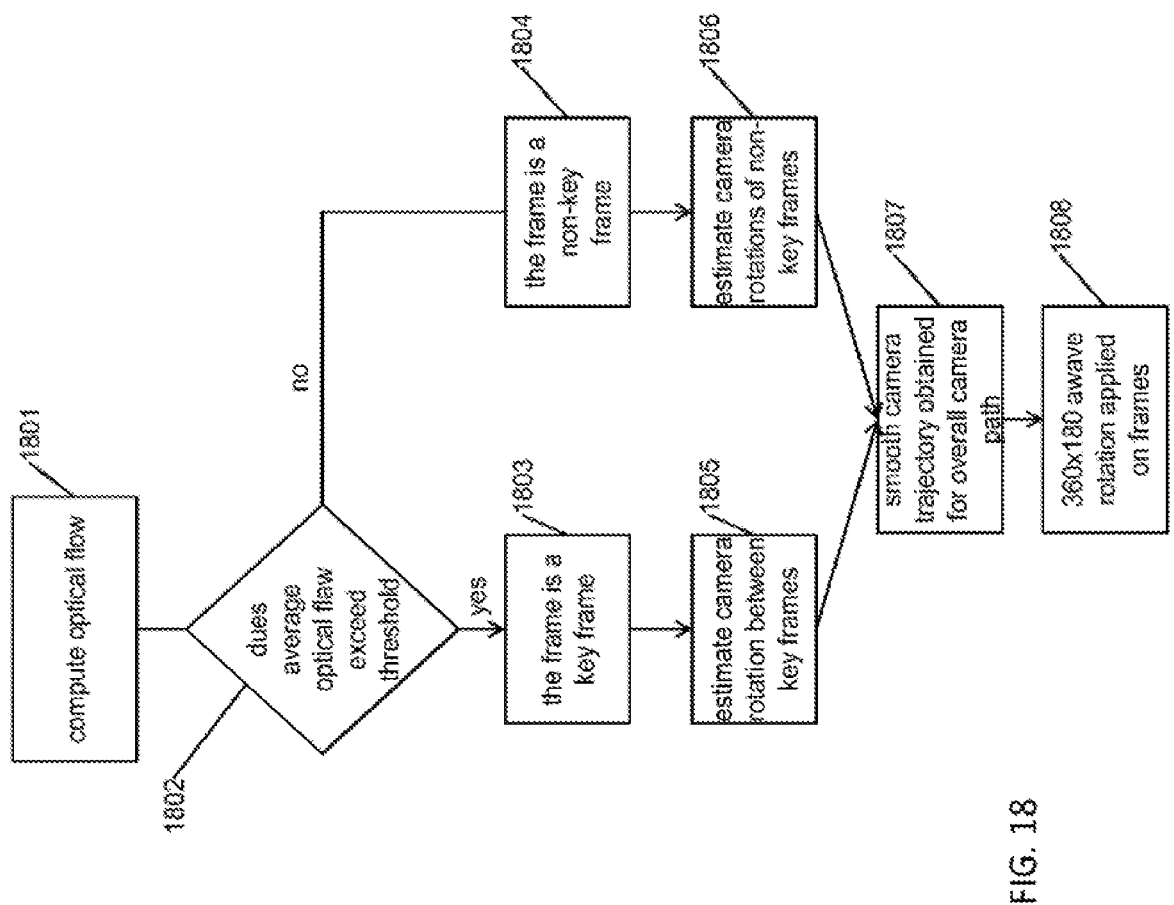
FIG. 18 provides an example of a method for video stabilization.

FIG. 18 provides an example of a method for video stabilization. Video stabilization (or image stabilization) may include computing optical flow from one from to another 1801. Such computation may occur on a cubemap.

A determination may be made whether average optical flow of a frame is more than a threshold value (e.g., th_{of}) 1802. If the average optical flow is more than or equal to the threshold, then a frame may be considered as a key frame 1803. A starting frame (e.g., first frame) may be considered a key frame. If the average optical flow is less than the threshold, the frame may be considered a non-key frame 1804.

A camera rotation may be estimated between key frames 1805. In some instances, a Nister 5 point algorithm may be employed to estimate the camera rotation. The rotations may be based on (i.e. with respect to) the first frame.

A camera rotation may be estimated for non-key frames 1806. An optimization algorithm may be used to estimate the rotation. The rotations may be based on (i.e. with respect to) the first frame.

A smooth camera trajectory may be obtained for the overall camera path 1807. The smooth camera trajectory may incorporate a new rotation.

An additional rotation may be applied to obtain a stabilized video 1808. In one example, the rotation may be a 360×180 aware rotation. This may be applicable for cases where the resulting panoramic image encompasses 360 degrees horizontal and 180 degrees vertical. The rotation may correspond to the range of the panoramic image.

Any of the calibration steps and/or computational steps may occur on-board the cameras or off-board the cameras. Any of the steps provided herein may occur with aid of one or more processors that may be located on-board or off-board the cameras. The processors may be located on one or more supports for the camera, on an underlying object, or away from an underlying object. For instance, the processors may be located on a user device (e.g., desktop computer, laptop, smartphone, tablet, personal digital assistant, etc.) or any other device (e.g., server) or combinations of devices (e.g., cloud computing infrastructure, peer-to-peer networks). Images captured by the cameras may be obtained by the processors for the computation. The images may be provided to the one or more processors via a wired connection or wireless communication. For example, the cameras may be mounted on or worn by an underlying object. Optionally, the omni-stereo image may be constructed on-board the cameras or a support of the cameras. The omni-stereo images may be constructed at or on the underlying object. The omni-stereo images may alternatively be constructed remotely. The omni-stereo video and/or images may be created in real-time (e.g., within 1 minute, 30 seconds, 20 seconds, 15 seconds, 10 seconds, 5 seconds, 3 seconds, 2 seconds, 1 second, 0.5 seconds, 0.1 seconds, 0.05 second, or 0.01 seconds of the image being captured). The systems and methods provided herein may advantageously allow for rapid processing that may allow for real-time formulation of the omni-stereo images. Alternatively, the computations may occur at a later time and the omni-stereo images may be formed at a later time.

Figure 13:
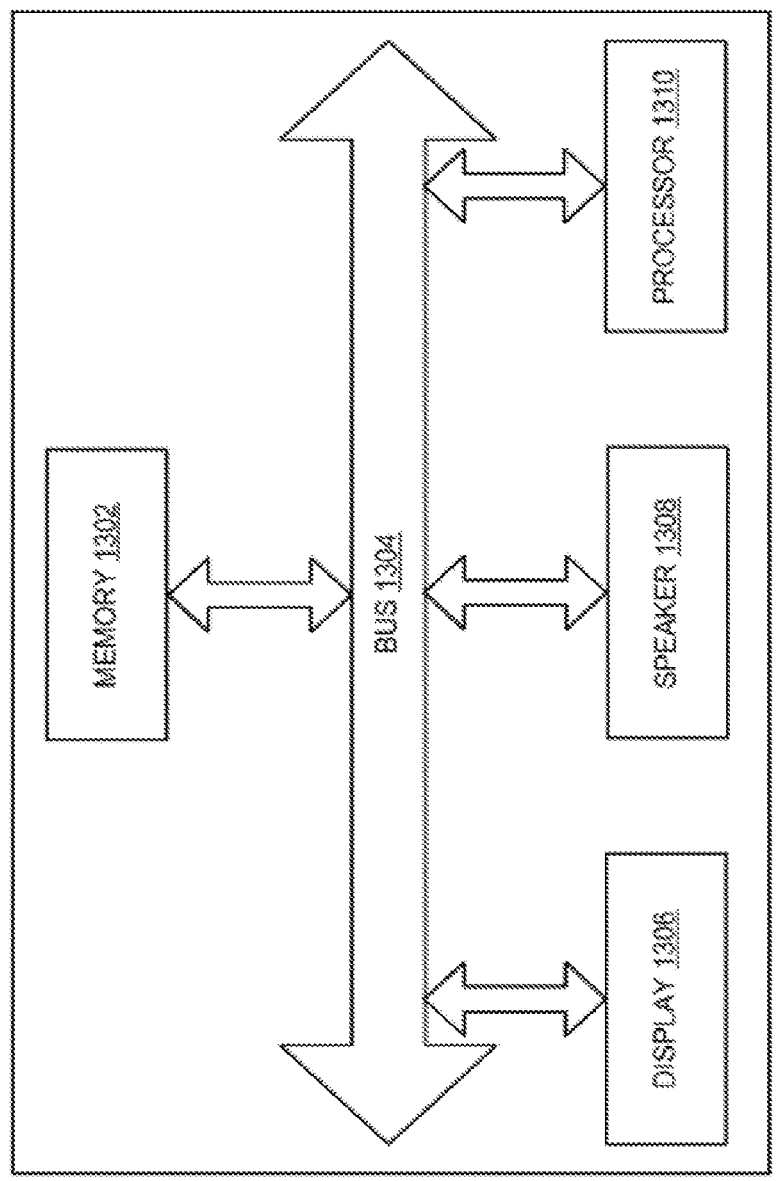
FIG. 13 illustrates the Architecture of system integration with Audio.

FIG. 13 illustrates an exploded view of the personal communication device having an a memory 1302 having a set of computer instructions, a bus 1304, a display 1306, a speaker 1308, and a processor 1310 capable of processing a set of instructions to perform any one or more of the methodologies herein, according to an embodiment herein. The processor 1310 may also enable digital content to be consumed in the form of video for output via one or more displays 1306 or audio for output via speaker and/or earphones 1308. The processor 1310 may also carry out the methods described herein and in accordance with the embodiments herein.

Digital content may also be stored in the memory 1302 for future processing or consumption. The memory 1302 may also store program specific information and/or service information (PSI/SI), including information about digital content (e.g., the detected information bits) available in the future or stored from the past. A user of the personal communication device may view this stored information on display 1306 and select an item of for viewing, listening, or other uses via input, which may take the form of keypad, scroll, or other input device(s) or combinations thereof. When digital content is selected, the processor 1310 may pass information. The content and PSI/SI may be passed among functions within the personal communication device using the bus 1304.

The techniques provided by the embodiments herein may be implemented on an integrated circuit chip (not shown). The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly.

The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface inter connections or buried inter connections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The embodiments herein can take the form of, an entirely hardware embodiment, an entirely software embodiment or an embodiment including both hardware and software elements. The embodiments that are implemented in software include but are not limited to, firmware, resident software, microcode, etc. Furthermore, the embodiments herein can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, remote controls, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 14:
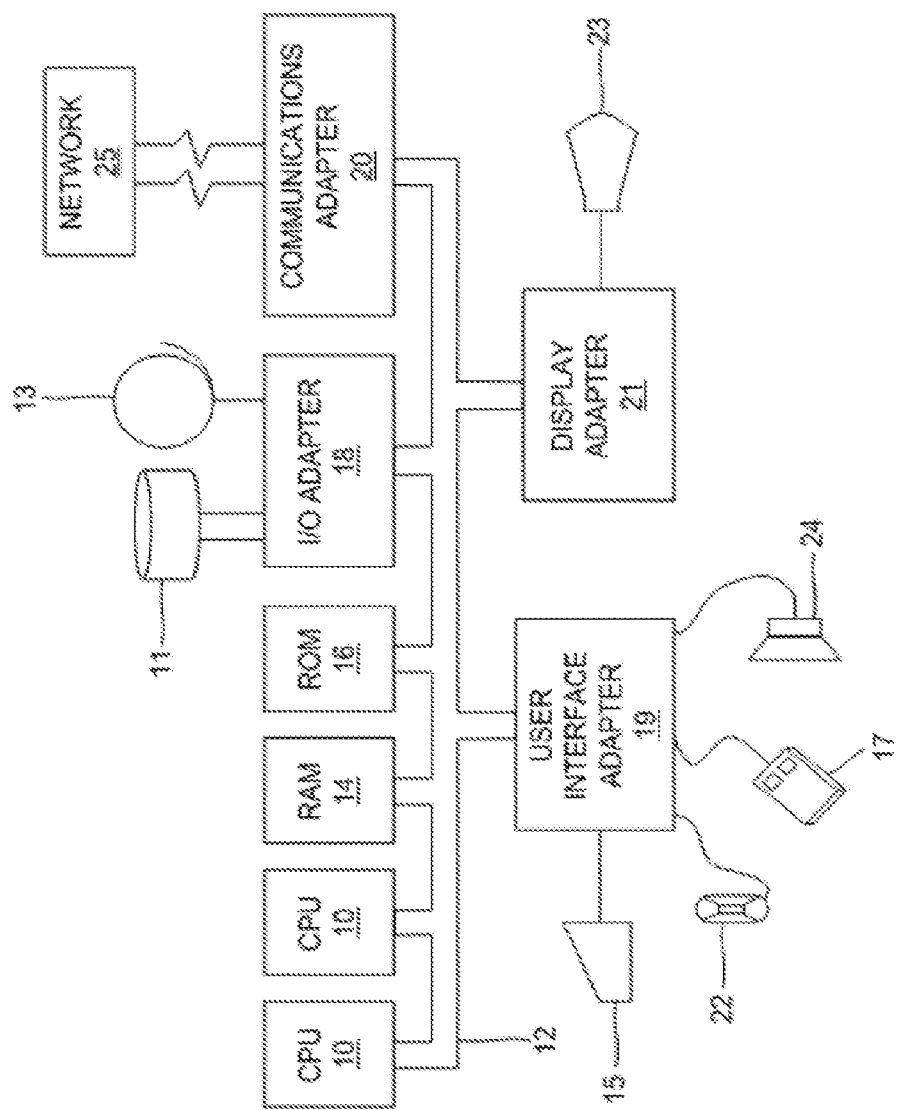
FIG. 14 illustrates the Internal Architecture of Audio Integrated Device.

A representative hardware environment for practicing the embodiments herein is depicted in FIG. 14. This schematic drawing illustrates a hardware configuration of an information handling/computer system in accordance with the embodiments herein. The system comprises at least one processor or central processing unit (CPU) 10. The CPUs 10 are interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments herein.

The system further includes a user interface adapter 19 that connects a keyboard 15, mouse 17, speaker 24, microphone 22, and/or other user interface devices such as a touch screen device (not shown) or a remote control to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

Figure 20:
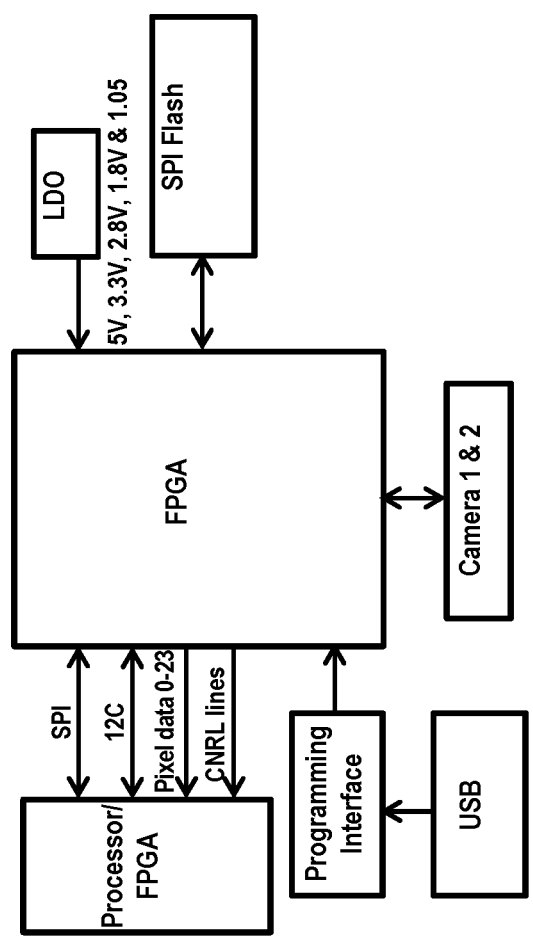
FIG. 20 shows an exemplary architecture of one or more hardware components of the system.

FIG. 20 shows an exemplary architecture of one or more hardware components of the system. Optionally, one or more FPGAs may be incorporated into the system. In one example, a programmable video bridging device may be provided that can support a variety of protocols and interfaces for mobile image sensors and/or displays. Various video interfaces may be supported, such as MIPI DPI, MIPI DBI, CMOS camera and display interfaces, Open LDI, FPD-Link, FLATLINK, MIPI D-PHY, MIPI CSI-2, MIPI DSI, SLVS200, SubLVDS, HiSPi, or others. The system may use ultra-low power. A sleep mode may be supported. In some embodiments, normal operation may fall within the range between any two of the following values: 1 mW, 3 mW, 5 mW, 10 mW, 20 mW, 30 mW, 50 mW, 75 mW, 100 mW, 150 mW, 200 mW, 300 mW, or 500 mW. In some instances ultra small footprint packages may be provided. For instance the footprint may be less than or equal to 50, 40, 30, 25, 20, 15, 10, 5, 3, 2, 1, 0.5, or 0.1 square inches.

The FPGA may be desired as a flexible MIPI-CSI and DSI bridging solution. In some instances, there may be up to two embedded Hard D-PHY blocks, two banks of flexible programmable I/O supporting a variety of standards such as D-PHY Rx, subLVDS, SLVS200, LVDS, and/or CMOS. A programmable logic core may be provided for providing the LUTs, memory, and system resources to implement a wide range of bridging options.

The systems and methods provided herein may allow cameras to interface with processors. Various cameras and/or processors with different interfaces may be accommodated.

Figure 21:
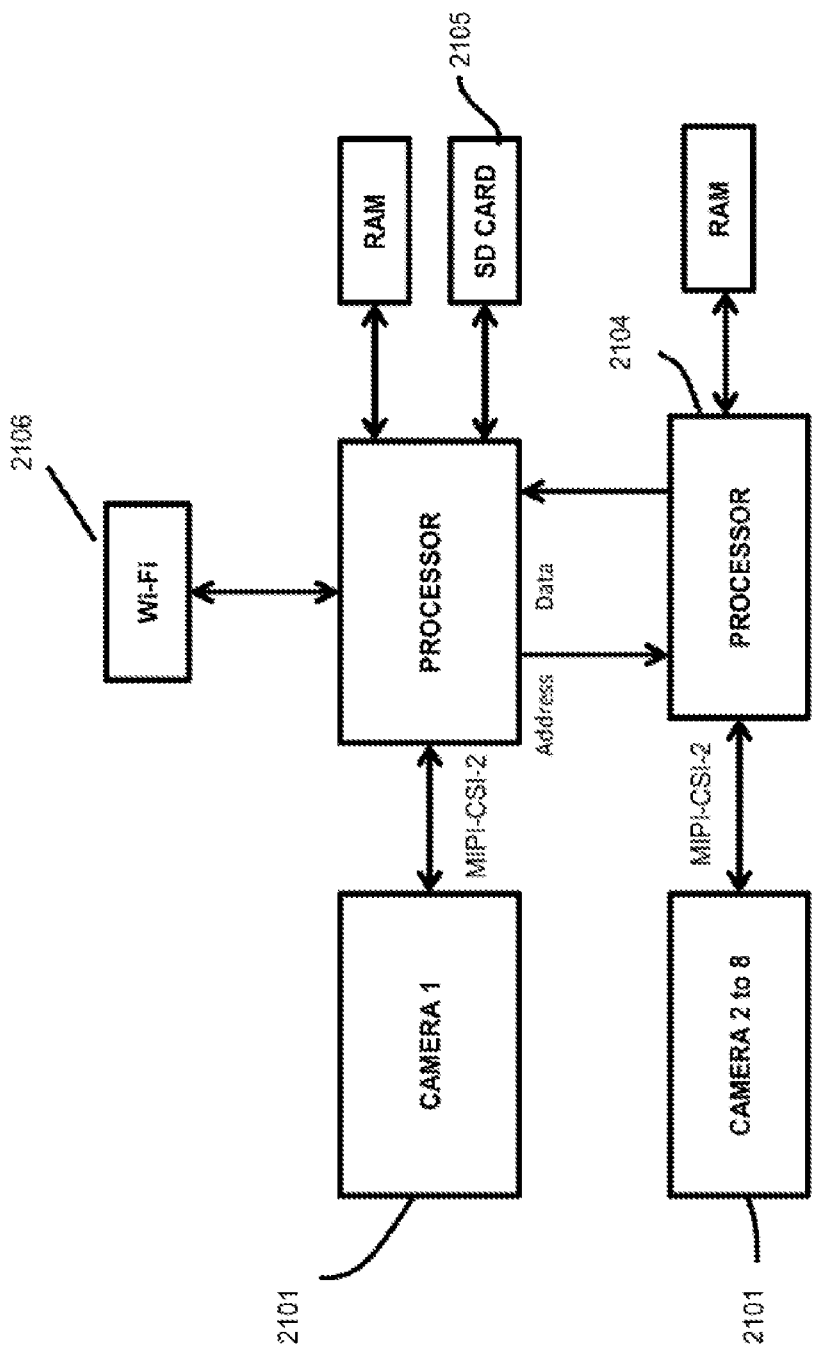
FIG. 21 shows an additional example of hardware architecture for the system.

FIG. 21 shows an additional example of hardware architecture for the system. The system may capture the video from the various cameras simultaneously. The video may be captured continuously or periodically. In some instances, a microphone interface may be provided. A removable memory storage, such as a memory card may optionally be used. For instance, a micro SD card slot may be provided. A communications interface may be provided, such as a Wi-Fi communications interface. A data transfer interface may be provided. The data may be transferred wirelessly and/or over a wired connection. For instance, a USB interface may be provided. The system may optionally be battery operated. A local power source may be provided. Alternatively, an interface may be provided to couple to an external power source.

The various camera modules 2101, 2102 may be interfaced to one or more processors 2103, 2104. In one example, one or more SC2000 processors may be provided. An image processor may have any desirable performance characteristics. For example, the image processing performance may reach at least 0.1, 0.3, 0.5, 0.7, 1.0, 1.2, 1.5 or 2.0 Giga pixels per second. In some instances, this may be achieved while maintaining a low power consumption. For instance, the power consumption may be lower than 0.01 W, 0.05 W, 0.1 W, 0.5 W, 1.0 W, 1.5 W, 1.7 W, 2.0 W, 2.5 W, 3.0 W, or 5.0 W.

The video from the cameras may be combined and/or stitched together. When using a fish-eye lens, it may be possible to capture a video with a winder field angle by correcting the distortion in real time.

Optionally, each camera may have its own processor. Alternatively one or more cameras may share a processor. In one example, one of the processors may be a master processor 2103. Other processors may be slave processors. The master processor may send a command to one or more slave modules 2104 for capturing images or videos. One or more slave modules may send a video or picture raw data to a master module using SPI or address, data and/or CS line.

The master module 2103 may save the raw data in a memory. The memory may be a removable memory, such as an SD card 2105. In some instances data may also be concurrently transferred to an external device via a communication unit (e.g., Wi-Fi module 2106). The external device may include a mobile device (e.g., smartphone, tablet, laptop) or a computer, server, cloud computing infrastructure, etc. The transferred data may optionally be previewed. The external device may include an application that receives the data and converts it to the desired format. For example, a mobile application on a mobile device may receive the raw data from the cameras an convert it to a panoramic image, or an omni-stereo image using one or more algorithms or computations. Pre-processing of the image and/or computations may or may not occur on the camera or processor/module. In some instances, pre-processing and/or computations occur at an external device.

Figure 22:
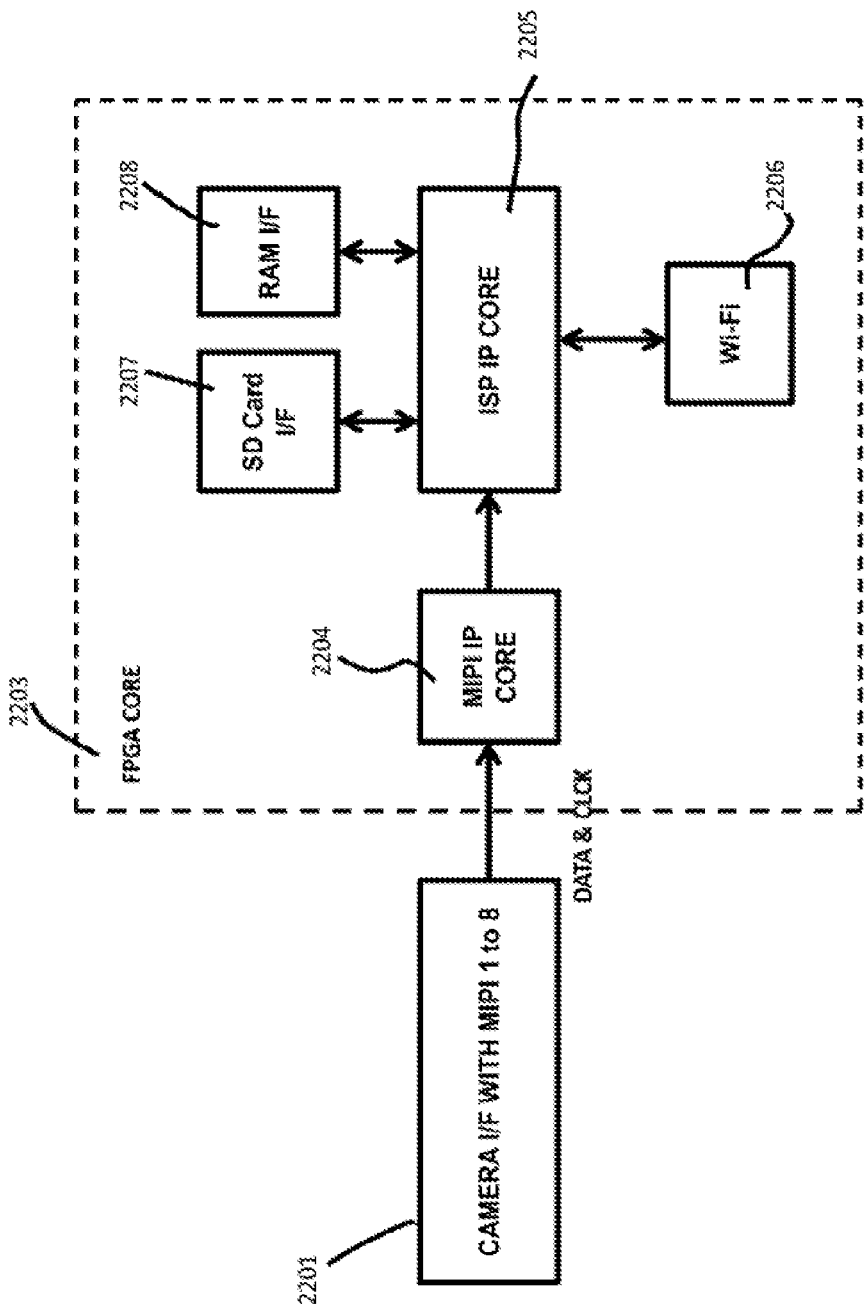
FIG. 22 shows a further example of hardware architecture for the system.

FIG. 22 shows a further example of hardware architecture for the system. The system may capture the video from the various cameras simultaneously. The video may be captured continuously or periodically. In some instances, a microphone interface may be provided. A removable memory storage, such as a memory card may optionally be used. For instance, a micro SD card slot may be provided. A communications interface may be provided, such as a Wi-Fi communications interface. A data transfer interface may be provided. The data may be transferred wirelessly and/or over a wired connection. For instance, a USB interface may be provided. The system may optionally be battery operated. A local power source may be provided. Alternatively, an interface may be provided to couple to an external power source.

The various camera modules 2201 may be interfaced to an FPGA 2203. A camera module may optionally have an MIPI CSO-2 Tx module. Optionally, an FPGA may have an IP core for MIPI CSO-2 Rx module. Any other combinations may be provided. A MIPI IP core 2204 may be interfaced to an ISP IP block 2205. An ISP block may obtain raw data from the camera and process the image. The ISP IP block may contain one or more sub blocks. Examples of sub blocks may include image cropper, defective pixel correction, black level correction, vignette correction, auto white balance, and/or color filter array. The FPGA may include a communication unit, such as a Wi-Fi module 2206. The communication unit may allow for data to be sent to an external device and/or uploaded to the cloud for preview. Optionally, one or more memory units may be provided. In one example, a removable memory such as an SD card 2207 may be provided. A RAM memory 2208 may also be provided.

The video from the cameras may be combined and/or stitched together. When using a fish-eye lens, it may be possible to capture a video with a winder field angle by correcting the distortion in real time.

In some embodiments, for an FPGA core, a SVTPlus–CSI2-F design may be employed to allow customized optimization of the IP according to required video formats and optional features. This may advantageously allow for optimized or improved FPGA size and reduced power consumption.

The FPGA core may optionally include one clock lane, and from 1 to 8 data lanes. A simple interface may be provided. For instance, legacy parallel-video input may be augmented by an Early-HD signal. An input interface may include parallel 1, 2 or 4 pixels per clock. A customized pixel-format support may be provided, to provide support any or all CSI2 2.0 pixel formats. Optionally simple off-FPGA analog front-end may be provided, which may be passive or active. Optional DPCM compression scheme may be used according to CSI2 specification. Optional calibration packet generation may be provided. An easy-to-use programming guide may be provided with the IP.

An input may be a parallel video stream, in one of the many formats supported by MIPI CSI2. Optionally, 1, 2 or 4 parallel pixels per clock can be provided as input. An HD input may be active throughout the video lines, and a VD input encapsulates video frames. A typical parallel video source may include any parallel-output digital camera.

A delay unit may be provided. The SVTPlus-CSI2-F uses an Early-HD (EHD) signal, to initiate the generation of long packets. Many cameras may have an internal indication prior to the start of the video stream, which can be used as EHD (for example, in image sensors—start column analog to digital conversion). In those cases, the delay unit may not be needed. When this is not the case, an optional delay unit can be added, delaying the parallel video stream into the SVTPlus core. The original HD will be used as EHD, while pixel input, HD and VD will be delayed.

The SVTPlus-Par-Out may be the RTL part of the IP. DPHY lanes can have two modes of operation—high-speed, in which each lane is a differential transmitter, and low-power, where each of the two wires of each lane can assume different CMOS levels, as defined by the protocol. The SVTPlus-Par-Out may drive the low-power levels directly, and output parallel bytes for the high-speed mode, which are then serialized.

One or more more serializers may be provided. Optionally, one serializer per lane may b eprovided. The SVTPlus-CSI2-F delivery includes an RTL serializer, which may be used if the required high bit rates are not high. For high bit rates, an I/O bound high-speed serializer can be used. Such serializers are FPGA specific, typically generated by a tool provided by the FPGA vendor.

The serialized high-speed lanes, in differential LVDS pairs, along with the low-power signals generated by the SVTPlus-par-out, may be output from the FPGA to an Analog-Front-End unit, which then drives the DPHY lanes. The analog front end may be DPHY compliant, in which case it is implemented by active components, or DPHY compatible, in which case passive components only are needed (but strict DPHY compliance is not provided).

The SVTPlus-par-out operation is governed and monitored by user accessible registers 2406. The registers are accessed by AMBA-APB cycles. Alternatively, an I2C-to-AMBA module can be ordered, allowing I2C access to the registers.

Bit rate at the parallel-video input and at the DPHY lanes output may be made to match. This is obtained by generating two clocks—FCLK for the lanes, and PIX-CLK for the input path. The frequency ratio FCLK/PIX-CLK must be equal to 2*PPC*BPP/Lanes, where PPC is the number of parallel pixels at the input (1, 2 or 4), BPP is the number of bits per pixel and Lanes is the number of configured DPHY lanes. FCLK and PIX-CLK are typically generated by a PLL, along with FCLK-90—a 90-degrees shift of FCLK, needed by the DPHY clock lane. A third clock—CPU-CLK is used for register I/O.

One or more external parameters may be provided. Some applications may require multiplexing of several video sources, using CSI2 Virtual Channels and/or different data types. This can be done by reprogramming the video parameters in the IP registers, but for more efficient multiplexing the customer may wish to use hardware multiplexing off the IP. In this case, the IP could be ordered with the External Parameters option—the parameters will be input into the IP via additional pads, and the corresponding registers need not be implemented.

An ISP core may be designed to provide correction tools to take the raw images from the camera sensor array, interpolate, white balance, color correct, noise reduce and condition the image prior to transmission or storage. This IP may decode the output from a digital camera image sensor and turn it into a viewable image. Typically, the sensor output is not arranged in a conventional RGB raster image format, and instead uses a "Bayer" or similar arrangement of pixels. Sensors often contain dead or noisy pixels and suffer from uneven lighting and other image quality anomalies that need to be resolved.

The ISP IP may include one or more sub blocks. For instance, an image cropper block may be used to geometrically crop the sensor output to remove unwanted edges. A defective pixel correction block can be designed to identify and replace defective pixels by statistical analysis of each pixel and its neighbors. A black level correction block may be designed to remove any offset (or cast) that is present in the Red, Green and Blue components. This may be caused by sensor 'dark charge' and other artifacts. A vignette correction block, which may provide a user defined matrix (e.g., 32×32 matrix), may be designed to remove intensity variations, typically circular in nature, caused by image aperture or zoom. An auto white balance block may be designed to compensate for the color distortions caused by the light spectrum differences with respect to the CIE Standard Illuminant D65. This block can also perform auto exposure. A color filter array block may be used to de-Bayer the image from the sensor to create a contiguous stream of Red, Green and Blue data.

The systems and methods provided herein may be useful for any type of application. For instance, the systems and methods provided herein may be useful for virtual reality and/or augmented reality applications. The systems and methods may be used in for cinematography, telepresence, video conferencing, event/news telecasts, and/or gaming. The systems and methods provided herein may also be utilized for autonomous machine applications. For instance, the systems and methods may be used for self-driving cars, ADAS, robotics, and/or drones. The systems and methods provided herein may be used for mapping applications. These may include street maps and/or three-dimensional reconstructions. The systems and methods provided herein may be used for medical applications. They can be used for patient health monitoring, or invasive body imaging. The systems and methods provided herein may aid in industrial applications such as automated guided vehicles (AGVs), fleet management, or robotic arms. In some instances the systems and methods provided herein may be useful for co-bots, material carrying and/or dropping, surveillance cameras, anti-drone systems, border surveillance, smart weapons, or other applications. The systems and methods provided herein may be useful for consumer applications such as mobile camera attachments, standalone cameras, mobile camera lens, action cameras, or DSLR attachments. The systems and methods may have surveillance or smart building applications, such as smart city, smart poles, or smart homes.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A method of calibrating cameras, comprising:
   determining one or more intrinsic or extrinsic camera parameters for each of a plurality of left eye cameras and a plurality of right eye cameras arranged along a viewing circle or a viewing ellipse and angled tangentially with respect to the viewing circle or the viewing ellipse;
   categorizing, with aid of one or more processors, left-right pairs of the plurality of left eye cameras and the plurality of right eye cameras into at least a first category, a second category and a third category;
   aligning the left-right pairs of cameras that fall into the first category, wherein the first category is a straight pair category comprising a left camera and a right camera pointing in the same direction;
   aligning the left-right pairs of cameras that fall into the second category, wherein the second category is a perpendicular pair category comprising a left camera and a right camera pointing in perpendicular directions with respect to one another; and
   aligning the left-right pairs of cameras that fall into the third category, wherein the third category is a consecutive pair category comprising a left camera and a right camera pointing in different directions with respect to one another, using extrinsic parameters of (i) the left-right pairs that fall into the first category and (ii) the left-right pairs that fall into the second category.

2. The method of claim 1, wherein the straight pairs of cameras comprise cameras facing in substantially a same direction such that one or more viewing axes of the cameras are substantially parallel to each other.

3. The method of claim 1, wherein the perpendicular pairs of cameras comprise cameras facing in substantially perpendicular directions such that one or more viewing axes of the cameras are substantially perpendicular to each other.

4. The method of claim 3, wherein the cameras have respective fields of view that (i) encompass a same or similar area or (ii) at least partially overlap.

5. The method of claim 1, wherein the consecutive pairs of cameras comprise cameras facing in substantially perpendicular directions such that one or more viewing axes of the cameras are substantially perpendicular to each other.

6. The method of claim 5, wherein the cameras have respective fields of view that encompass different areas.

7. The method of claim 1, wherein aligning the left-right pairs of cameras comprises adjusting a position of one or more cameras of the plurality of left eye cameras and the plurality of right eye cameras.

8. The method of claim 7, wherein adjusting the position of the one or more cameras comprises displacing or rotating the one or more cameras.

9. The method of claim 1, wherein aligning the left-right pairs of cameras comprises adjusting an orientation of one or more cameras of the plurality of left eye cameras and the plurality of right eye cameras.

10. The method of claim 1, wherein aligning the left-right pairs of cameras comprises (i) gathering data about a disposition of one or more cameras of the plurality of left eye cameras and the plurality of right eye cameras and (ii) using the data to process or adjust one or more images captured using the one or more cameras.

11. The method of claim 10, wherein the disposition of the one or more cameras comprises a position or an orientation of the one or more cameras.

12. The method of claim 1, wherein aligning the left-right pairs of cameras comprises adjusting one or more intrinsic or extrinsic camera parameters associated with one or more cameras of the plurality of left eye cameras and the plurality of right eye cameras.

13. The method of claim 12, wherein the intrinsic camera parameters comprise at least one of shutter speed, focal length, focal depth, aperture, ISO, image sensor format, principal point, and lens distortion.

14. The method of claim 12, wherein the extrinsic camera parameters comprise at least one of camera position, camera orientation, camera heading, camera angle, camera viewing center, and camera heading relative to a reference frame or a set of reference coordinates.

15. The method of claim 1, wherein aligning the left-right pairs of cameras comprises aligning one or more cameras of the plurality of left eye cameras and the plurality of right eye cameras based on depth information.

16. The method of claim 1, wherein aligning the left-right pairs of cameras comprises aligning one or more cameras of the plurality of left eye cameras and the plurality of right eye cameras in sequence or in parallel.

* * * * *